US011899805B2

(12) United States Patent
San Pedro et al.

(10) Patent No.: US 11,899,805 B2
(45) Date of Patent: Feb. 13, 2024

(54) LIMITING VIDEO SURVEILLANCE COLLECTION TO AUTHORIZED USES

(71) Applicant: IDEMIA National Security Solutions LLC, Alexandria, VA (US)

(72) Inventors: Marc Rene San Pedro, Alexandria, VA (US); Brian Scott Swann, Alexandria, VA (US); James Arville Loudermilk, II, Alexandria, VA (US)

(73) Assignee: IDEMIA National Security Solutions LLC, Alexandria, VA (US)

( * ) Notice: Subject to any disclaimer, the term of this patent is extended or adjusted under 35 U.S.C. 154(b) by 328 days.

(21) Appl. No.: 17/472,022

(22) Filed: Sep. 10, 2021

(65) Prior Publication Data

US 2022/0083676 A1 Mar. 17, 2022

Related U.S. Application Data

(60) Provisional application No. 63/077,417, filed on Sep. 11, 2020.

(51) Int. Cl.
*G06F 21/62* (2013.01)
*G06F 21/60* (2013.01)
(Continued)

(52) U.S. Cl.
CPC ............ *G06F 21/62* (2013.01); *G06F 21/602* (2013.01); *G06V 20/41* (2022.01); *G06V 20/52* (2022.01);
(Continued)

(58) Field of Classification Search
CPC ..... H04L 67/12; H04L 63/0428; H04L 67/02; H04L 9/50; H04L 67/10;
(Continued)

(56) References Cited

U.S. PATENT DOCUMENTS 7,825,950 B2 * 11/2010 Rottmann ............ G06V 40/161
348/78
9,953,187 B2 * 4/2018 Rylski .................. G06V 40/172
(Continued)

FOREIGN PATENT DOCUMENTS

| EP | 1308916 A1 | 5/2003 |
| WO | 2015/088156 A1 | 6/2015 |
| WO | 2017/143407 A1 | 8/2017 |

OTHER PUBLICATIONS

Boult. (2005) "PICO: Privacy through Invertible Cryptographic Obscuration," Proceedings of the Computer Vision for Interactive and Intelligent Environment, Nov. 17-18, 2005, Washington, DC; 12 pages.

(Continued)

*Primary Examiner* — Sharif E Ullah
(74) *Attorney, Agent, or Firm* — Morrison & Foerster LLP

(57) ABSTRACT

Provided herein are systems and methods for automatically limiting video surveillance collection to authorized uses and authorized users. To achieve this control, the authorization system can be configured to manage and secure a plurality of crypto keys associated with encrypting a plurality of corresponding video footages and release a crypto key for a video footage at approved times to limit user access to the video footage. In particular, the surveillance system can generate a video collection including a copy of portions of a received video footage that include one or more approved events from a watchlist of a user. Thereafter, the video footage can be encrypted by a first key managed by the authorization system and prevents the user from accessing video content of the video footage once encrypted. Accord- (Continued)

ingly, the user may be limited to accessing the video collection and not all the portions in the encrypted video footage.

33 Claims, 8 Drawing Sheets

(51) Int. Cl.
    *H04N 7/18*     (2006.01)
    *G06V 20/40*     (2022.01)
    *G06V 20/52*     (2022.01)

(52) U.S. Cl.
    CPC ...... *H04N 7/183* (2013.01); *G06F 2221/2111* (2013.01); *G06V 20/44* (2022.01)

(58) Field of Classification Search
    CPC . H04L 2012/40215; H04L 2012/40273; H04L 63/105; H04W 4/70; H04W 4/80; H04W 84/12; H04W 12/04; H04W 12/02; H04W 12/06; H04W 88/06; H04W 4/06; G06F 3/0488; G06F 3/0484; G06F 3/017; G06F 3/0482; G06F 11/2035; G06F 13/14; G06F 3/013; G06F 21/62
    USPC .......... 726/2, 21, 28, 36; 713/150, 163, 181; 380/255, 264, 276
    See application file for complete search history.

(56) References Cited

U.S. PATENT DOCUMENTS

| | | | | |
|---|---|---|---|---|
| 10,162,943 B2* | 12/2018 | Park | ................... | H04L 9/088 |
| 2003/0174842 A1* | 9/2003 | Challener | ............. | H04L 63/061 |
| | | | | 380/277 |
| 2005/0132204 A1* | 6/2005 | Gouguenheim | ...... | H04L 9/0877 |
| | | | | 713/193 |
| 2007/0002141 A1* | 1/2007 | Lipton | ..................... | H04N 7/18 |
| | | | | 348/143 |
| 2007/0057048 A1* | 3/2007 | Plotkin | ................... | G06F 21/78 |
| | | | | 235/382 |
| 2008/0109642 A1* | 5/2008 | Beutler | ............... | G06F 11/1637 |
| | | | | 712/225 |
| 2008/0117295 A1* | 5/2008 | Ebrahimi | ......... | G08B 13/19604 |
| | | | | 348/143 |
| 2009/0328177 A1* | 12/2009 | Frey | ...................... | H04L 9/3213 |
| | | | | 726/9 |
| 2010/0017615 A1* | 1/2010 | Boesgaard Sorensen | ................... | |
| | | | | G06F 21/554 |
| | | | | 713/176 |
| 2010/0257578 A1* | 10/2010 | Shukla | ................ | G06F 21/6218 |
| | | | | 726/1 |
| 2011/0145581 A1* | 6/2011 | Malhotra | .............. | H04L 9/3271 |
| | | | | 725/91 |
| 2012/0324552 A1* | 12/2012 | Padala | .................. | H04L 9/3213 |
| | | | | 726/6 |
| 2013/0219178 A1* | 8/2013 | Xiques | .................... | H04L 65/70 |
| | | | | 713/168 |
| 2013/0318358 A1* | 11/2013 | Wang | .................... | H04L 9/0866 |
| | | | | 713/182 |
| 2014/0023248 A1* | 1/2014 | Yoo | .................. | G08B 13/19686 |
| | | | | 382/118 |
| 2014/0079221 A1* | 3/2014 | McCallum | ........... | H04L 9/0822 |
| | | | | 380/277 |
| 2014/0331297 A1* | 11/2014 | Innes | .................. | H04L 63/0823 |
| | | | | 726/7 |
| 2015/0222697 A1* | 8/2015 | Bassiouny | .............. | H04L 65/65 |
| | | | | 709/203 |
| 2017/0316185 A1* | 11/2017 | Park | ...................... | H04L 63/102 |
| 2017/0358195 A1* | 12/2017 | Bobda | ............. | G08B 13/19613 |
| 2018/0174414 A1* | 6/2018 | Edpalm | ................ | H04N 19/136 |

OTHER PUBLICATIONS

Zhang et al. (2012) "Privacy Enabled Video Surveillance Using a Two State Markov Tracking Algorithm," Multimedia Systems 18: 175-199.

* cited by examiner

LIMITING VIDEO SURVEILLANCE COLLECTION TO AUTHORIZED USES

CROSS-REFERENCE TO RELATED APPLICATIONS

This application claims the priority of U.S. Provisional Application No. 63/077,417, filed Sep. 11, 2020, the entire contents of which are incorporated herein by reference.

FIELD

The present disclosure relates generally to collecting video surveillance data and in particular, limiting collected video surveillance data to authorized uses.

BACKGROUND

Video surveillance was initially performed using closed circuit television (CCTV) and was first installed in Germany in 1942 for military purposes to observe launch of V-2 rockets during their development. Since then, video surveillance has become omnipresent and has extended to a variety of non-military applications including in banks, patient monitoring at hospitals, industrial machine monitoring, retail stores of all kinds, public and private venues with substantial traffic volumes, and increasingly in private residences. For example, video monitoring has long been used to improve security through traffic monitoring, crime reduction and deterrence, retail theft prevention, false liability claims prevention, loitering detection, prisoner monitoring, vandalism deterrence, etc.

Due to the technological improvements in digital cameras and memory storage, large volumes of high quality pictures and video can be obtained from digital cameras and stored at relatively low costs. As a result, in the past few decades, video footage has been over-collected which not only prevents efficient review of collected video, but also raises privacy concerns and encroaches on the rights of individuals captured in recorded video. Moreover, due to the higher quality pictures, an ever increasing amount of data storage is required to store video content of the same duration. For example, during the 2005 London subway bombing incident, over 6,000 hours of CCTV footage was stored. Even using computer-assisted review of the video footage has become increasing resource intensive and inefficient especially considering that the 6,000 hours of video translated into about 22 terabytes (TB) of data.

Accordingly, it is desirable to limit video footage collection only to authorized uses.

SUMMARY

As discussed above, current video surveillance systems over-collect video content and captures video of both events of interests and many bystanders, which raises significant privacy concerns. One approach to addressing these concerns may include discarding portions of video footage such that only approved events are captured in retained (i.e., non-discarded) portions of the video footage. Regardless of the surveillance application such as for private, commercial, or government user, there is sometimes a need to access the original video footage. Therefore, there exists a need for systems and methods for controlling compliance of video surveillance to authorized uses, which may change over time.

Disclosed here in are methods for limiting video surveillance to authorized uses, comprising: at a surveillance system: receiving a video footage of an area under surveillance from a security camera; analyzing the video footage to detect a plurality of events in the video footage; generating a video collection comprising a copy of a plurality of portions of the video footage based on applying a watchlist indicating an approved event of interest to the analyzed video footage, wherein each copied portion is detected to include the approved event; encrypting the video footage using a first key to restrict a first user from accessing other portions of the video footage that do not include the approved event; and providing the first user access to the video collection.

Some examples of the disclosure are directed to A surveillance system for limiting video surveillance to authorized uses, comprising: one or more processors; memory comprising a local storage; and one or more programs, wherein the one or more programs are stored in the memory and configured to be executed by the one or more processors, the one or more programs including instructions for: receiving a video footage of an area under surveillance from a security camera; analyzing the video footage to detect a plurality of events in the video footage; generating a video collection comprising a copy of a plurality of portions of the video footage based on applying a watchlist indicating an approved event of interest to the analyzed video footage, wherein each copied portion is detected to include the approved event; encrypting the video footage using a first key to restrict a first user from accessing other portions of the video footage that do not include the approved event; and providing the first user access to the video collection.

Some examples of the disclosure are directed to a non-transitory computer-readable storage medium comprising one or more programs for targeted video surveillance processing, wherein the one or more programs, when executed by one or more processors, cause the one or more processors to: receiving a video footage of an area under surveillance from a security camera; analyzing the video footage to detect a plurality of events in the video footage; generating a video collection comprising a copy of a plurality of portions of the video footage based on applying a watchlist indicating an approved event of interest to the analyzed video footage, wherein each copied portion is detected to include the approved event; encrypting the video footage using a first key to restrict a first user from accessing other portions of the video footage that do not include the approved event; and providing the first user access to the video collection.

Additionally or alternatively to one or more examples disclosed above, the approved event comprises a class of targets or a specific target. Additionally or alternatively to one or more examples disclosed above, the watchlist comprises an indication of the approved event and a plurality of associated parameters for video surveillance, and the method comprises: determining which video segments of the video footage meets the plurality of parameters and includes the approved event, wherein the plurality of copied portions of the video footage comprises the determined video segments. Additionally or alternatively to one or more examples disclosed above, the plurality of parameters comprises one or more locations and one or more time periods approved for surveilling the target. Additionally or alternatively to one or more examples disclosed above, the plurality of parameters includes a location approved for surveilling the event, and the method comprises: determining that the video footage is associated with the approved location before generating the video collection. Additionally or alternatively to one or more examples disclosed above, determining that the video footage is associated with the approved location comprises one of: analyzing the video footage to identify one or more features that uniquely identifies the location; or determining that metadata of the received video footage indicates the location. Additionally or alternatively to one or more examples disclosed above, the method comprises: transmitting the first key to an authorization system that controls access to a plurality of encrypted video footages; receiving a notification from the authorization system indicating that the first key was received and securely stored by the authorization system; and irrecoverably delete the first key from the surveillance system. Additionally or alternatively to one or more examples disclosed above, the first key is a first public key, comprising: receiving the first public key from an authorization system that controls access to a plurality of encrypted video footage, wherein the authorization system stores a first key pair comprising the first public key and a first private key, and wherein the encrypted video footage can only be decrypted using the first private key located at the authorization system. Additionally or alternatively to one or more examples disclosed above, providing the users access to the video collection comprises: encrypting the video collection using a second key pair associated with the user to prevent other users from being able to access the video collection, wherein the video collection is decrypted using the second key pair when access to video content in the video collection is requested by the user. Additionally or alternatively to one or more examples disclosed above, analyzing the video footage comprises: generating a metadata file comprising an index that maps each event from the plurality of targets to one or more portions of the video footage detected to include the event. Additionally or alternatively to one or more examples disclosed above, wherein the method further comprises: encrypting the metadata file with the first key. Additionally or alternatively to one or more examples disclosed above, generating the video collection comprises: identifying the plurality of portions of the video footage that include the approved event by searching the metadata file; and copying the plurality of identified portions to the video collection. Additionally or alternatively to one or more examples disclosed above, the method comprises: generating a second metadata file that includes the index for the approved event and that removes or redacts the index to non-approved events of the plurality of events. Additionally or alternatively to one or more examples disclosed above, the approved event is a first approved event, wherein the watchlist indicates a second disapproved event whose captured video cannot be accessed by the users, and wherein each copied portion is detected to include the first approved event and not include the second disapproved event. Additionally or alternatively to one or more examples disclosed above, the method comprises receiving a request from an authorization system to apply an updated watchlist associated with the users to the encrypted video footage; decrypting the encrypted video footage encrypted by a first encryption key using a decryption key received from the authorization system; generate a second video collection including a copy of a second plurality of portions from the decrypted video footage based on the updated watchlist, wherein each portion comprises one or more approved events from the updated watchlist; encrypting the decrypted video footage using a second encryption key to restrict the users from accessing other portions of the video footage not approved by the updated watchlist; and provide the users access to the second video collection.

BRIEF DESCRIPTION OF THE DRAWINGS

The present disclosure will now be described, by way of example only, with reference to the accompanying drawings, in which.

DETAILED DESCRIPTION

Figure 1A:
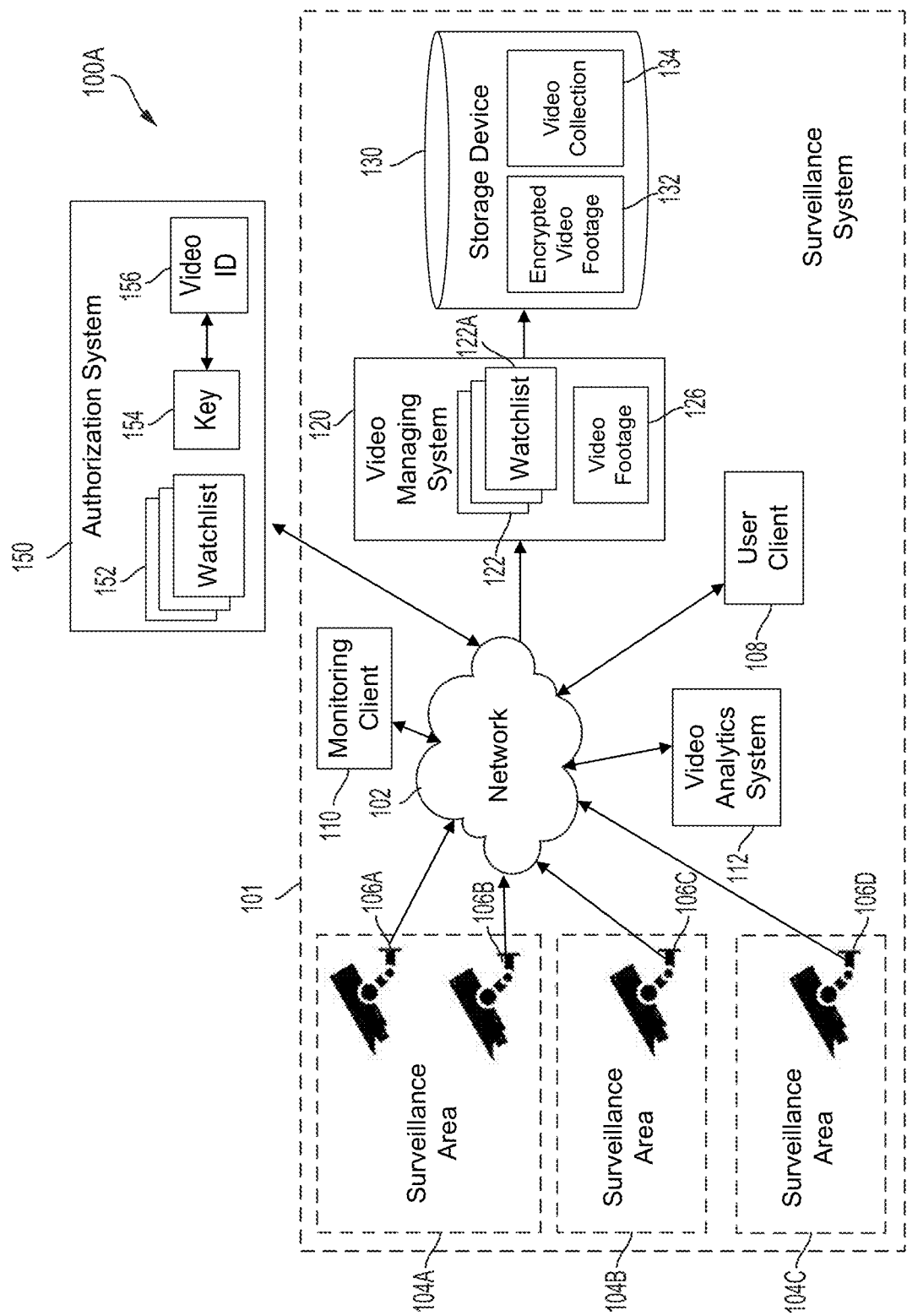
FIG. 1A illustrates a system including an authorization system for limiting video surveillance executed by a surveillance system to authorized uses, according to some embodiment.

As discussed above, larger and larger volumes of video footage are being captured and stored. Moreover, many bystanders or non-authorized collection targets are captured in the video. Therefore, there exists a need for a video authorization system that controls how a video surveillance system collects and stores video content such that only approved targets are captured and whose video can be reviewed by approved users. In some embodiments, to achieve this control, the authorization system can be configured to manage and secure a plurality of crypto keys associated with encrypting a plurality of corresponding video footages and release a crypto key for a video footage at approved times to limit user access to the video footage. In particular, the surveillance system can generate a video collection including a copy of portions of a received video footage that include one or more approved events from a watchlist of a user. Thereafter, the video footage can be encrypted by a first key managed by the authorization system and prevents the user from accessing video content of the video footage once encrypted. Accordingly, the user may be limited to accessing the video collection and not all the portions in the encrypted video footage.

In the following description of the various embodiments, reference is made to the accompanying drawings, in which are shown, by way of illustration, specific embodiments that can be practiced. The description is presented to enable one of ordinary skill in the art to make and use the invention and is provided in the context of a patent application and its requirements. Various modifications to the described embodiments will be readily apparent to those persons skilled in the art and the generic principles herein may be applied to other embodiments. Thus, the present invention is not intended to be limited to the embodiment shown but is to be accorded the widest scope consistent with the principles and features described herein.

As used herein, the singular forms "a," "an," and "the" used in the following description are intended to include the plural forms as well unless the context clearly indicates otherwise. It is to be understood that the term "and/or" as used herein refers to and encompasses any and all possible combinations of one or more of the associated listed items. It is further to be understood that the terms "includes," "including," "comprises," and/or "comprising," when used herein, specify the presence of stated features, integers, steps, operations, elements, components, and/or units but do not preclude the presence or addition of one or more other features, integers, steps, operations, elements, components, units, and/or groups thereof.

Certain aspects of the present invention include process steps and instructions described herein in the form of a method. It should be noted that the process steps and instructions of the present invention could be embodied in software, firmware, or hardware, and, when embodied in software, they could be downloaded to reside on, and be operated from, different platforms used by a variety of operating systems. Unless specifically stated otherwise as apparent from the following discussion, it is appreciated that, throughout the description, discussions utilizing terms such as "processing," "computing," "calculating," "determining," "displaying," or the like refer to the action and processes of a computer system, or similar electronic computing device, that manipulates and transforms data represented as physical (electronic) quantities within the computer system memories or registers or other such information storage, transmission, or display devices.

The present disclosure in some embodiments also relates to a device for performing the operations herein. This device may be specially constructed for the required purposes, or it may comprise a general purpose computer selectively activated or reconfigured by a computer program stored in the computer. Such a computer program may be stored in a non-transitory, computer readable storage medium, such as, but not limited to, any type of disk, including floppy disks, USB flash drives, external hard drives, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The methods, devices, and systems described herein are not inherently related to any particular computer or other apparatus. Various general-purpose systems may also be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the present invention as described herein.

FIG. 1A illustrates a system 100A including an authorization system 150 for limiting video surveillance executed by a surveillance system 101 to authorized uses, according to some embodiments.

In some embodiments, authorization system 150 can be managed by a different entity than surveillance system 101 and cannot be accessed directly by users of surveillance system 101. In some embodiments, authorization system 150 can be configured to manage watchlists 152 of one or more events of interest (e.g., one or more persons or a specific person) and their respective processing policies, as will be further described below. For example, a watchlist may indicate an event and assign a collection policy that specifies parameters under which video content of that event can be collected. In some embodiments, authorization system 150 can be configured to be accessed by an authorized user. Authorization system 150 may permit the authorized user to configure one or more watchlists 152 such as add or remove targets as well as add, revise, or remove one or more processing policies associated with each target. In some embodiments, this authorization user possesses different credentials or a different role than a surveillance user that accesses surveillance system 101.

For example, in a law enforcement surveillance scenario, the surveillance user may be an officer or other law enforcement personnel and the authorized user may be associated with a court or a judicial office. Therefore, since the authorized user, e.g., a court official, controls which video content can be collected by the surveillance user, the surveillance user may be restricted to accessing captured video of only those events (e.g., persons of interest) previously approved by the authorization user. In some embodiments, the surveillance user can submit a request to the authorization user or authorization system 150 directly for an updated watchlist. For example, the surveillance user may have subsequently received approval (e.g., via a granted warrant) to monitor additional events. In this case, once authorization system 150 verifies the request, authorization system 150 can update one or more watchlists 152 and permit video managing system 120 to access additional video content, as will be further described below.

In some embodiments, authorization system 150 can be configured to manage and secure a plurality of crypto keys for securing a plurality of respective video footages generated by surveillance system 101. For example, authorization system 150 may store an association between one or more keys 154 with a video ID 156 uniquely identifying a video footage or a video feed (e.g., from a security camera) providing the video footage. As will be further described below, one or more keys 154 may be used by surveillance system 101 to encrypt video footage such that the surveillance user cannot directly access video content in the encrypted video footage without express authorization from authorization system 150.

In some embodiments, surveillance system 150 can implement one or more symmetric-key encryption algorithms to encrypt the video footage. In these embodiments, key 154 may be a crypto key that can both encrypt and decrypt video data. In some embodiments, when the surveillance user has been approved to access encrypted video footage 132, authorization system 150 can be configured to transmit, for example, key 154 to video managing system 120 to permit encrypted video footage 132 to be decrypted. In some embodiments, as will be further described below, surveillance system 150 can be configured to delete a received key 154 after decrypting and/or re-encrypting the video footage.

In some embodiments, surveillance system 150 can implement one or more asymmetric-key encryption algorithms to encrypt the video footage. In these embodiments, key 154 may include a key pair of a public key and a private key. In some embodiments, video data that is encrypted by the public key can only be decrypted using the private key and vice versa. In these embodiments, when the surveillance user has been approved to access encrypted video footage 132, authorization system 150 can be configured to transmit, for example, a private key from a first key pair and a public key from a second key pair to video managing system 120. The private key may be used by surveillance system 150 to decrypt encrypted video footage 132. After surveillance system 150 completes processing a decrypted video footage, surveillance system 150 can apply the public key of the second key pair to re-encrypt the video footage. Accordingly, the surveillance user can no longer access the re-encrypted video footage because the surveillance user does not possess a private key part of the second key pair secured on authorization system 150.

In some embodiments, surveillance system 101 includes a video managing system 120 for managing targeted video surveillance processing of video footage from a plurality of surveillance areas 104A-C, according to some embodiments. System 100A includes a plurality of security cameras 106A-D for observing surveillance areas 104A-C within a field of view of respective security cameras 106A-D. For example, security cameras 106A-B may be installed at specific locations to monitor surveillance area 104A. Likewise, security cameras 106C and 106D may be installed at specific locations to monitor surveillance areas 104B and 104C, respectively.

In some embodiments, surveillance cameras 106A-D can include a box-style security camera, a dome security camera, a pan, tilt, and zoom (PTZ) camera, a bullet security camera, a day/night security camera, a thermal security camera, or a wide-dynamic security camera. In some embodiments, as shown in system 100A, security cameras 106A-D may be IP cameras that can transmit digital signals using Internet Protocol over network 102. An IP camera may include one or more network interfaces (e.g., a wired network interface and/or a wireless network interface) to connect to network 102. In some embodiments, network 102 can include a local area network (LAN), a wide area network (WAN) such as the Internet, or a combination thereof.

In some embodiments, security cameras 106A-D can capture respective fields of view within surveillance areas 104A-C and generate video footage comprising video data representing the captured fields of view. In some embodiments, a video footage can be encoded to include a plurality of video frames and associate each video frame with a timestamp. As will be further described below, security cameras 106A-D can be configured to transmit the generated video footage to video managing system 120 through network 102. For example, the video footage may be routed to network 102 directly or through a router device or a wireless access point. In some embodiments, security cameras 106A-D may be connected to a Power over Ethernet (PoE) switch that is connected to network 102. In some embodiments, security cameras 106A-D can be configured to route video footage to video analytics system 112, whose outputs can be routed to video managing system 120.

In some embodiments, a security camera such as security camera 106A can include various hardware and/or software to capture a field of view and generate video data including analog and digital signals. For example, the security camera may include one or more image sensors such as a high-definition image sensor, a no/low light image sensor, or a specialized image sensor sensitive to spectrum ranges of light. In some embodiments, the security camera can include a video codec such as H.264, MPEG-4, MPEG-2, HEVC (H.265), etc. to compress and encode video footage for storage or for transmission to video managing system 120 over network 102. In some embodiments, the security camera may be powered through DC power such as through a Power over Ethernet (PoE) connection or through AC power via an electrical outlet. In some embodiments, the security camera can include one or more network interfaces to couple to network 102 such as, for example, an Ethernet interface, a wireless chip, a mobile communications interface, etc.

In some embodiments, video managing system 120 can be configured to receive and process one or more video footages generated by security cameras 106A-D via network 102, as will be further described below with respect to FIG. 2. In some embodiments, video managing system 120 can include one or more servers. For example, these servers may be provided by a cloud architecture to enable reliability of processing and scalability to process video footage from additional security cameras. In some embodiments, video footage can include recorded video or be a live video streamed from security cameras 106A-D to video managing system 120. Therefore, video managing system 120 may include a buffer to temporarily store a plurality of video footages while each video footage is being processed.

In some embodiments, video managing system 120 includes a plurality of watchlists 122 that control whether and how received video footage is to be processed. In some embodiments, a watchlist may include one or more events of interests represented by one or more corresponding indicators and be associated with one or more processing policies, as will be further described below with respect to FIG. 2. In some embodiments, a processing policy can include a collection policy associated with collecting video of one or more approved events of interest in a watchlist such as watchlist 122A. In some embodiments, the collection policy includes a plurality of surveillance parameters such as one or more approved locations and one or more approved time periods for collecting video of the one or more approved events in watchlist 122A.

In some embodiments, video managing system 120 can receive video footage 126 from one of surveillance cameras 106A-D and analyze video footage 126 to generate a plurality of video segments or clusters of video segments based on watchlists 122. In some embodiments, video managing system 120 can process each video segment or cluster based on one or more processing policies associated with watchlists 122. In some embodiments, a watchlist may include a plurality of events of interest that must be matched before the video segment or the video cluster can be assigned the one or more processing policies associated with the watchlist. In some embodiments, a watchlist can include a combination of watchlists from watchlists 122. In some embodiments, one or more of watchlists 122 can associated with one or more specific security cameras or one or more specific surveillance areas. For example, a first watchlist from watchlist 122 may be assigned to surveillance area 104B such that the first watchlist should be applied to any video footage deriving from surveillance area 104B, e.g., captured by security camera 106C.

In some embodiments, video managing system 120 can include a user interface to permit a user to access watchlists 122 through a user client 108. In some embodiments, similar to monitoring client 110, user client 108 can be provided on a user device (e.g., a tablet, a smartphone, a computer, a desktop, a smartwatch, etc.) that can connect to network 102 to access video managing system 120. In some embodiments, user client 108 may include a standalone application or a thin client downloaded on the user device. In other embodiments, the user may access user client 108 by accessing a website portal associated with video managing system 120. In various embodiments, the user may be prompted with login credentials before being permitted to configure watchlists 122. In some embodiments, video managing system 120 can further control how the user may configure watchlists 122 based on an access privilege possessed by an authenticated user. In some embodiments, a surveillance user may be permitted to change retention policies that control how long collected video is to be stored. However, the surveillance user may be disallowed from controlling a collection policy as to whether certain video content can be collected. As described above, the authorization user of authorization system 150 may be permitted the capability to update watchlist 152 including the collection policy.

In some embodiments, video managing system 120 can be configured to interface and communicate with video analytics system 112 to process received video footage. In some embodiments, video managing system 120 can transmit received video footage to video analytics system 112 configured to recognize and detect events of interest within one or more portions of the video footage. In some embodiments, video analytics system 112 can be configured to generate a plurality of video segments from the video footage based on which events of interest are detected within the video frames of the video footage.

In some embodiments, a video segment includes a portion of the video footage that includes video frames in which video analytics system 112 detected one or more of the same events of interest. In some embodiments, video analytics system 112 can tag the video segment with metadata including one or more indicators of the one or more events of interest detected by video analytics system 112. Accordingly, video analytics system 112 can be configured to generate a plurality of video segments which may include overlapping video content from the video footage. In some embodiments, video analytics system 112 can be configured to discard portions of the video footage in which no events of interest are detected. In some embodiments, video analytics system 112 can be configured to transmit a plurality of generated video segments tagged with a plurality of corresponding metadata to video managing system 120 via network 102. In some embodiments, video analytics system 112 can select one or more frames for each video segment as representative of prominent features of the video segment.

Returning to video managing system 120, video managing system 120 can be configured to generate a plurality of clusters of video segments received from video analytics system 112 based on the metadata of the video segments, according to some embodiments. For example, video managing system 120 may aggregate a plurality of video segments sharing at least one indicator in common with a video cluster associated with the at least one indicator. In another example, video managing system 120 may aggregate a plurality of video segments sharing a plurality of specific indicators in common with a video cluster associated with that plurality of specific indicators. In some embodiments, video managing system 120 can then match one or more common indicators associated with each video cluster to indicators in watchlists 122 to identify one or more watchlists to apply to the video cluster. For example, in response to determining that the video cluster has two common indicators present in a first watchlist, video managing system 120 may process the video cluster according to the processing policies specified in the first watchlist.

In some embodiments, video managing system 120 can generate a video collection including one or more video segments or one or more video clusters based on analyzing video footage 126, as described above. Additionally, video managing system 120 can generate a metadata file that describe the video collection and include an index of events or features to portions of video footage 126 in which each event or feature is detected. As will be further described below with respect to FIG. 2, video managing system 120 can encrypt video footage 126 stored as encrypted video footage 132 to prevent surveillance users from accessing non-approved events in video footage 126 without express authorization from authorization system 150.

In some embodiments, video managing system 120 can generate a video collection 134 for a surveillance user and that includes video segments or clusters of approved events as indicated in watchlist 122A associated with the surveillance user. For example, video managing system 120 can copy portions of video footage 126, while unencrypted, to video collection 134, wherein each portion is determined to include one or more approved events as indicated in watchlist 122A. In some embodiments, video managing system 120 can encrypt video collection 134 using a key possessed by the surveillance user to prevent other non-approved users from being able to access video collection 134.

In some embodiments, based on a referral policy specified in the watchlist matching a particular video cluster, video managing system 120 may generate a notification or a delayed notification to surveillance users through monitoring client 110 to review the video cluster or generate no alerts to the user. In some embodiments, based on a retention policy specified in the watchlist matching the particular video cluster, video managing system 120 can be configured to discard the video cluster and not forward the video cluster for long term retention in storage device 130. In other embodiments, video managing system 120 can transmit the video cluster to storage device 130 to be retained for a period of time indicated in the retention policy. In some embodiments, however, at least the entirety of video footage 126 is stored as encrypted video footage 132. For example, for law enforcement applications, portions of video footage 126 selectively captured may present a defendant in an unfavorable light without presenting juries with the entire video footage 126 to show the full picture. In one or more examples, under discovery, the defendants counsel could obtain the unencrypted video footage 126 to support counterarguments.

In some embodiments, storage device 130 can be configured to provide long term storage of video data transmitted from video managing system 120 to storage device 130. For example, storage device 130 may store video footage, video collection, metadata files, and encrypted versions of each type of video data. As described above, the video segments or video clusters may be derived from video footage captured by security cameras 106A-D. In some embodiments, storage device 130 can include hard drives, solid state disk (SSD) drives, or be a network attached storage (NAS) system. In some embodiments, storage device 130 can be provided by one or more cloud storage devices (e.g., NAS devices) to permit mass storage of large and increasing volumes of video data.

In traditional video data storage solutions, a data storage may either be configured to store video data indefinitely until a user chooses to delete the video data or the video data may be retained for a default period of time (e.g., one or two months). In the first scenario, indefinitely storing ever increasing volumes of video data is not feasible and would continually require more storage hardware to store video data. In the second scenario, storing video data for a default period of time is inefficient since portions of video data may be of higher priority and should be retained for longer periods of time whereas other portions of video data may not need to be retained at all or can be retained for brief periods of time. In some embodiments, as described above and will be further described below, storage device 130 can be configured to store video collections (e.g., including clusters or video segments) or video footage according to a retention policy determined by video managing system 120.

In some embodiments, the retention policy may include a retention date after which video is to be deleted or include a duration of time such as a number of days, weeks, months, years, etc. For example, a first video cluster may include video content showing specific persons of interest (i.e., example events of interest) and may be assigned a first retention policy of, for example, 3 years. In another example, a second video cluster may include video content showing movement of one or more detected persons (i.e., example events of interest) and may be assigned a second retention policy of, for example, 9 months. In the second example, the second video cluster may not need to be retained for as long as the first video cluster because users are less likely to need long term surveillance of all persons in contrast to surveillance of specific persons of investigative interest.

In some embodiments, system 100A includes a monitoring client 110 that permits the surveillance user to review video collection 134 storing portions of video footage including approved events of interest (as indicated in watchlist 122A). In some embodiments, monitoring client 110 can include a central monitoring station or a user device (e.g., a laptop, a computer, a workstation, a smartphone, a tablet, etc.) that can connect to network 102 to access video managing system 120. In some embodiments, monitoring client 110 may include a standalone application or a thin client downloaded on the user device. In other embodiments, the user may access monitoring client 110 by accessing a website portal associated with video managing system 120. In various embodiments, the user may be prompted with login credentials before being permitted to review portions of video footage authorized for review. In some embodiments, as described above, video managing system 120 may assign an immediate alert to a video cluster or portion of video footage 126. In these embodiments, video managing system 120 can be configured to generate and send the immediate alert to the user through monitoring client 110 to notify the user to perform immediate video review. In other embodiments, video managing system 120 may assign a delayed alert to a video cluster. In these embodiments, video managing system 120 may store video clusters assigned to the delayed alert. The user may review these stored video clusters at a subsequent time via monitoring client 110. In some embodiments, users may be permitted to review portions of video footage (e.g., video clusters) stored in storage device 130 using monitoring client 110.

Figure 1B:
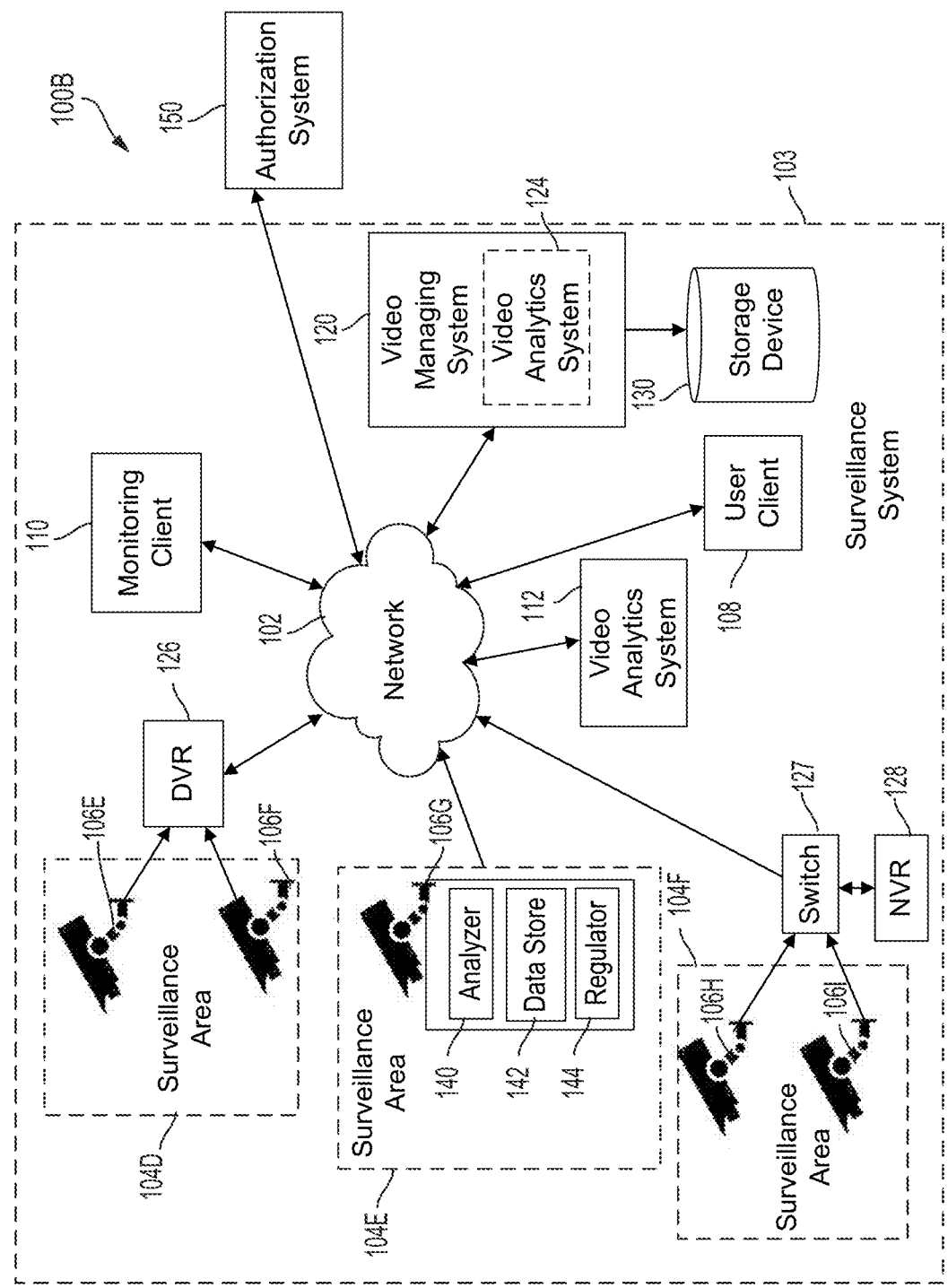
FIG. 1B illustrates a system including an authorization system for limiting video surveillance executed by a surveillance system to authorized uses, according to some embodiments.

FIG. 1B illustrates a system 100B including an authorization system 150 for limiting video surveillance executed by surveillance system 103 to authorized uses, according to some embodiments. System 100B shows many of the same components as those described above with respect to system 100A of FIG. 1A. In contrast to system 100A which showed surveillance cameras 106A-D, system 100B shows that video managing system 120 can be configured to process a video stream or a video footage captured by other types of surveillance cameras 106E-I, according to some embodiments. Video managing system 120 can be configured to perform video surveillance across a plurality of surveillance areas 104D-F, according to some embodiments.

In some embodiments, in addition to security cameras 106A-D which are IP cameras described with respect to FIG. 1A, video managing system 120 can be configured to process video footage captured by an analog camera system such as analog cameras 106E-F (also referred to as closed-circuit television (CCTV) cameras) monitoring surveillance area 104D. In these embodiments, analog cameras 106E-F can be physically coupled to a digital video recorder (DVR) 126 through respective cables (e.g., coaxial cables). In some embodiments, DVR 126 can be configured to convert the analog video captured by analog cameras 106E-F into digital video footage. In some embodiments, DVR 126 can be coupled to network 102 through a network device (e.g., a router, a switch, etc.) and configured to transmit the digital video footage to video managing system 120 for further processing. In some embodiments, video footage captured by analog cameras 106E-F can be temporarily buffered in DVR 126, whereas the video footage transmitted to video managing system 120 may be stored in storage device 130 for longer periods of time depending on whether certain criteria are met, as described above with respect to FIG. 1A. For example, the video footage stored in DVR 126 may be stored for a default period of time (e.g., 8 hours, 1 day, 1 week, etc.) that permits DVR 126 enough time to offload the video footage to video managing system 120. In some embodiments, DVR 126 can be configured to store the captured video footage on its internal storage device until the video footage is forwarded to video managing system 120, after which the video footage may be deleted or marked for deletion.

In some embodiments, in addition to or alternative to security cameras 106A-D described with respect to FIG. 1A, video managing system 120 can be configured to process video footage captured by edge video devices such as edge camera 106G. Edge camera 106G can be an IP camera co-located with video analytics capabilities and optionally data storage functionality. For example, edge camera 106G may include an analyzer 140 configured to provide near real-time video analytic functionality including some or all of those provided by video analytics system 112, as described above with respect to FIG. 1A. Like video analytics system 112, analyzer 140 may be configured to analyze the video footage to determine whether one or more video segments include one or more events of interest (e.g., one or more targets) as well as tag indicators to each video segment to indicate detected events of interest. In some embodiments, edge camera 106G can store one or more of watchlists 122 specific to edge camera 106G or surveillance area 104E and the one or more stored watchlists may indicate the one or more events of interest to be detected. In some embodiments, the one or more watchlists can be received from authorization system 140. In some embodiments, analyzer 140 can transmit a plurality of video segments and one or more associated indicators to video managing system 120 for further processing. In some embodiments, analyzer 140 can also perform some or all of the functionality as that provide by video managing system 120 and described above. In these embodiments, analyzer 140 may generate clusters of video segments, match video clusters to one or more watchlists 122 stored locally on edge camera 106, and process a video cluster according to the one or more processing policies in a watchlist matching the video cluster.

For example, as described above with respect to FIG. 1A, a watchlist may include one or more classes of objects or one or more specific objects or persons. The watchlist may also include one or more processing policies including a collection policy. The processing policies may also include a retention policy and/or a review policy. In response to analyzer 140 determining that, for example, a video segment or a cluster of video segments is detected to include a target and that meets the review policy, analyzer 140 may alert a user through monitoring client 110 based on the review policy and/or transmit the video segment or video cluster over network 102 for long term storage depending on the retention policy associated with the watchlist.

In some embodiments, edge camera 106G can include a regulator 144 configured to control and enforce compliance policies for video surveillance performed by edge camera 106G. In particular, regulator 144 can provide one or more of the same control and enforcement functions provided by video managing system 120. For example, In some embodiments, video footage captured by edge camera 106G can be stored in data store 142. For example, a plurality of video segments of the video footage may be temporarily buffered in data store 142 while analyzer 140 runs video analytics on each video segment. In some embodiments, data store 142 may be configured to store the video segments for a default period of time (e.g., 8 hours, 1 day, 3 days, 1 week, etc.). In some embodiments, once analyzer 140 finishes processing a video segment, analyzer 140 can be configured to delete the video segment from data store 142 or to mark the video segment for deletion.

In some embodiments, the types of analytics functionality as well of available processing speed of edge camera 106G may depend on power, heat dissipation, and size/weight constraints of edge camera 106G. One advantage of edge camera 106G is that unlike IP cameras such as security cameras 106A-D, edge camera 106G does not need to be continuously connected to network 102 to route captured video footage to video managing system 120 for further processing. In some embodiments, analyzer 140 on edge camera 106G can perform fine grained filtering based on one or more watchlists or perform a first filtering step to reduce the amount of video footage that is transferred over to network 102 to be further processed by video managing system 120.

In some embodiments, in addition to or alternative to security cameras 106A-D described with respect to FIG. 1A, video managing system 120 can be configured to process video footage captured by IP cameras 106H-I that are not directly connected to network 102. In some embodiments, IP cameras 106H-I may be directly connected to a network video recorder (NVR) 128 or indirectly connected to NVR 128 through switch 127. For example, IP cameras 106H-I may be connected to NVR 128 through a wired connection (e.g., Ethernet cables) or a wireless connection (e.g., WiFi). In some embodiments, switch 127 may include a power-over-Ethernet (PoE) switch that provides both power and data communication to IP cameras 106H-I.

In some embodiments, NVR 128 can be configured to record video footage captured by IP cameras 106H-I and store captured video footage. In some embodiments, like DVR 126, NVR 128 can be configured to forward stored video footage to video managing system 120 for further processing. For example, NVR 128 may transmit the video footage via a router connected to switch 127. In some embodiments, NVR 128 may function as temporary storage for captured video footage, whereas video footage transmitted to video managing system 120 may be retained for long term storage on storage device 130 depending on whether certain criteria are met, as described above with respect to FIG. 1A. For example, NVR 128 may store captured video footage for a short period of time (e.g., 1 hour, 8 hours, 1 day, etc.) whereas video footage stored on storage device 130 can be retained for much longer periods of time (e.g., 6 months, 9 months, 1 year, 7 years, etc.). In some embodiments, NVR 128 can be configured to store the captured video footage on its internal storage device until the video footage is forwarded to video managing system 120, after which the video footage may be deleted or marked for deletion.

In some embodiments, functions provided by video analytics system 112 may be implemented by video managing system 120. For example, video managing system 120 may include a video analytics system 124 which may correspond to video analytics system 112. In some embodiments, video analytics system 124 may include one or more objects databases or face databases to permit video analytics system 124 to detect classes of objects or motion, specific objects or persons, or a combination thereof.

Figure 2:
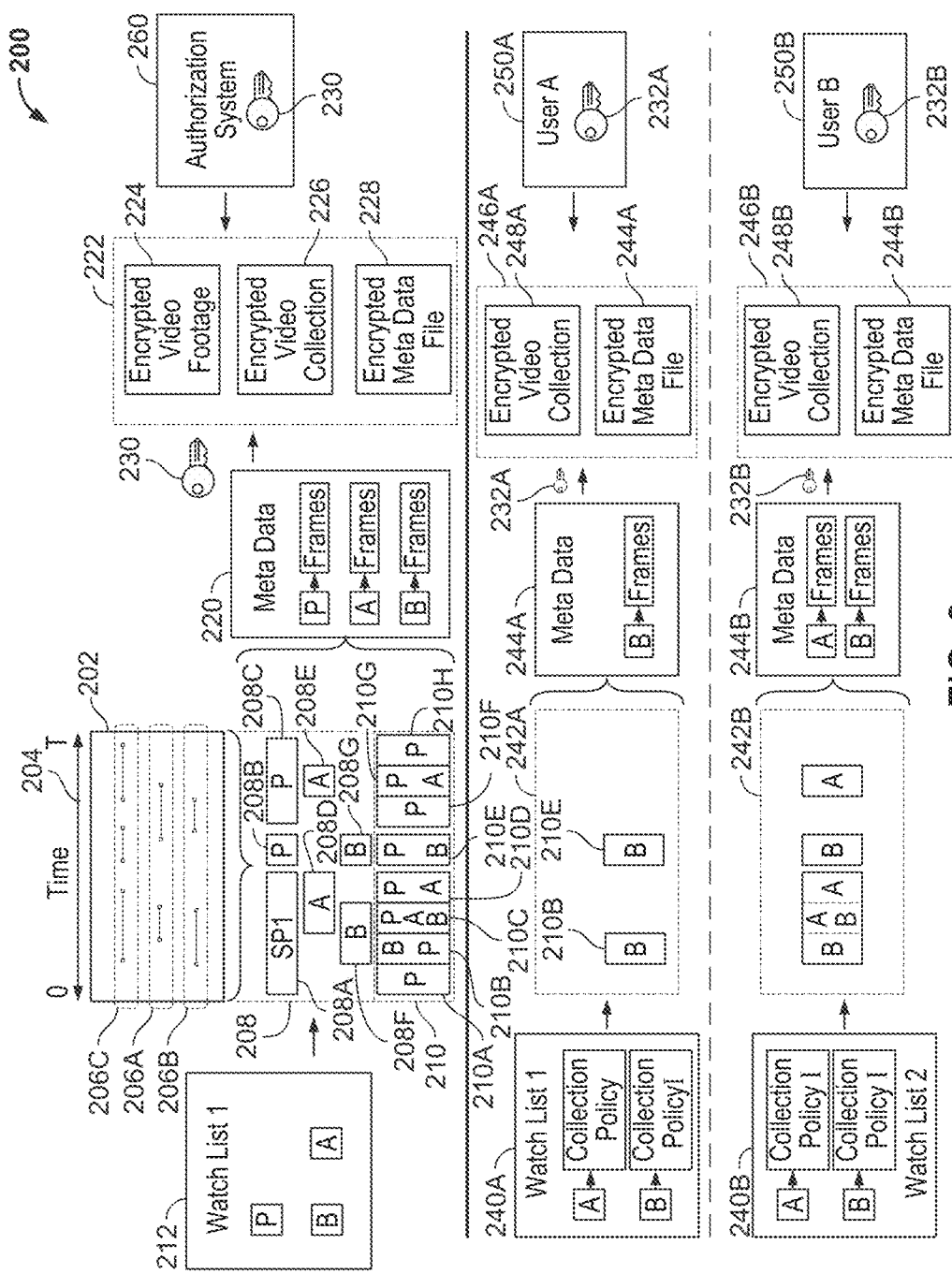
FIG. 2 illustrates a block diagram showing examples for how a video footage is processed to generate video collections accessible by respective users, according to some embodiments.

FIG. 2 illustrates a block diagram 200 showing examples for how a video footage 202 is processed to generate video collections 248A-B accessible by respective users 250A-B, according to some embodiments. For ease of reference, the following descriptions may refer to one or more components of system 100A, as described above with respect to FIG. 1A. As described above with respect to FIG. 1A, each video collection can include captured video content including only events of interests approved for collection for the user.

As shown in diagram 200, video footage 202 can span a time period 204 from time 0 to T. Video managing system 120, with assistance from video analytics system 112, can detect a plurality of events (e.g., indicating targets P, A, and B) in portions of video footage 202. In some embodiments, the plurality of events are indicated in watchlist 212. For example, the line markings 206A-C show time periods from time period 204 for respective events A, B, and C during which each respective event is detected. For example, line marking 206C shows periods of time where one or more persons P are detected. Similarly, line markings 206A-B show periods of time where in video footage 202 specific persons A and B, respectively, are detected.

In some embodiments, video managing system 120 can be configured to generate a plurality of video segments based on the events of interest in watchlist 212. For example, video managing system 120 may generate a video segment as one or more video frames that are detected to include an event in watchlist 212. For example, video segments 208 may include video segments 208A-C for event P and corresponding to time periods shown by line markings 206C. Similarly, video segments 208 may include video segments 208D-E and video segments 208F-G for events A and B, respectively, and corresponding to the time periods shown in line markings 206A-B, respectively. In some embodiments, video managing system 120 can copy one or more portions of video footage 204 to generate the video segments.

In some embodiments, video managing system 120 can generate video segments 210 that can each be tagged with one or more indicators of events of interest. For example, video segments 210A, 210F, and 210H may be generated and associated with only event P; video segments 210B and 210E are associated with both events B and P; video segments 210D and 210G are associated with both events A and P; and video segment 210C is associated with events P, A, and B. In some embodiments, video managing system 120 can generate video segments 210 based on video footage 202 or from video segments 208. In some embodiments, video managing system 120 can generate clusters of video segments in which each cluster shares one or more indicators in common. For example, video managing system 120 may generate a video cluster for target A and include, for example, video segments 208D and 208E.

In some embodiments, video managing system 120 can select one or more frames from each video segment to represent the salient features of each video segment. Then, video managing system 120 can analyze the one or more selected frames to detect one or more features to associate with each video segment.

In some embodiments, to permit faster and more flexible retrieval and analysis of certain events of interest, video managing system 120 can generate metadata file 220 based on video footage 202 and video segments 208 and/or 210. In some embodiments, metadata file 220 includes an index of a plurality of events (e.g., as indicated in watchlist 212) and that associates each event with one or more portions of video footage 202 in which that event is detected. In some embodiments, the index can associate an event with one or more video frames, one or more video segments from video segments 208-210, or one or more time periods from video footage 202. In some embodiments, metadata file 220 can also include an index of detected features and associated video segments in which each features is detected. By keeping these indices, metadata file 220 may permit authorized users to search and retrieve video segments associated with desired targets and/or events having certain features.

In some embodiments, user 250A (i.e., user A) may be associated with watchlist 240A that specifies events A and B and respective collection policies. In some embodiments, a collection policy for an event can include one or more surveillance parameters that specify criteria for collecting video content of that event. In some embodiments, the parameters can include one or more of a location, a time period, and whether that event's video can be viewed by user 250A. For example, the collection policy for event B may indicate approved video collection of B during time period 204 of video footage 202 and the collection policy for event A may indicate disapproved video collection of A during time period 204 of video footage 202. Accordingly, video managing system 120 may copy one or more portions of video footage 202 to video collection 242A that includes approved event B and does not include disapproved event A. For example, video collection 242A may include copies of video segments 210B and 210E from video segments 210. In some embodiments, video managing system 120 can determine the portions to include in video collection 242A based on searching metadata file 220 and identifying one or more of video segments 208-210.

In some embodiments, similar to generation of metadata file 220 for video footage 202, video managing system 120 can generate metadata file 244A associated with generated video collection 242A. In some embodiments, metadata file 244A can include an index of approved events (e.g., event B) and link to one or more video segments, clusters, or video frames in which an approved event is detected. For example, the metadata file 244A may list video segments 210B and 210E in video collection 242A and associated these segments with event B. In some embodiments, metadata file 244A can be generated based on metadata file 220. For example, metadata file 244A may omit or discard portions of metadata file 220 that include reference to disapproved event A.

As described above with respect to FIG. 1A, watchlists associated with different users may permit each user to access only video content of approved targets with respect to each user. In some embodiments, user 250B (i.e., user B) may be associated with watchlist 240B that specifies events A and B and respective collection policies. For example, the collection policy for events A and B may indicate approved video collection of A and B during time period 204 of video footage 202. Accordingly, video managing system 120 may copy one or more portions of video footage 202 to video collection 242B that includes approved event A or B. For example, video collection 242B may include copies of video segments 210B-210D, 210E, and 210G. In contrast to video collection 242A, video collection 242B can include portions of video footage that depict target A. Similar to generation of metadata file 244A for video collection 242A, video managing system 120 can generate metadata file 244B associated with generated video collection 242B. For example, metadata file 244B can include an index of approved events (e.g., event A and B) and link to one or more video segments, clusters, or video frames in which an approved event is detected.

As described above with respect to FIG. 1A, once video footage 202 has been processed (e.g., to generate video collections 242A and 242B), video managing system 120 can generate encrypted video footage data using an encryption key 230. In some embodiments, video managing system 120 can encrypt video footage 202, video collection of segments 208-210, and metadata file 220 to generate encrypted video footage 224, encrypted video collection 226, and encrypted metadata file 228. In some embodiments, encryption key 230 may be managed and secured by authorization system 260 to prevent surveillance users that access video managing system 120 from being able to decrypt any of encrypted video footage data 222. In some embodiments, once encrypted video footage data 222 is generated, video managing system 120 may irrecoverably delete encryption key 230. In some embodiments in which video managing system 120 implements one or more asymmetric encryption algorithms, encryption key 230 may be a public key of a key pair managed by authorization system 260. Once encrypted, video managing system 120 cannot decrypt encrypted video footage data 222 without access to a private key of the key pair managed by authorization system 260.

In some embodiments, video collections 242A-B may be stored unencrypted on storage device 130 to permit surveillance users 250A-B to access and view video content captured in video collections 242A-B. In some embodiments, to increase security to limit access to a video collection only to those users permitted to access the video collection, each video collection and associated data may be encrypted by user-specific keys. For example, video managing system 120 may encrypt video collection 242A and metadata file 244A with a key 232A possessed by user 250A to generate encrypted video collection data 246A including encrypted video collection 248A and encrypted metadata file 249A. Similarly, video managing system 120 may encrypt video collection 242B and metadata file 244B with a key 232B possessed by user 250B to generate encrypted video collection data 246B including encrypted video collection 248B and encrypted metadata file 249B.

Figure 3:
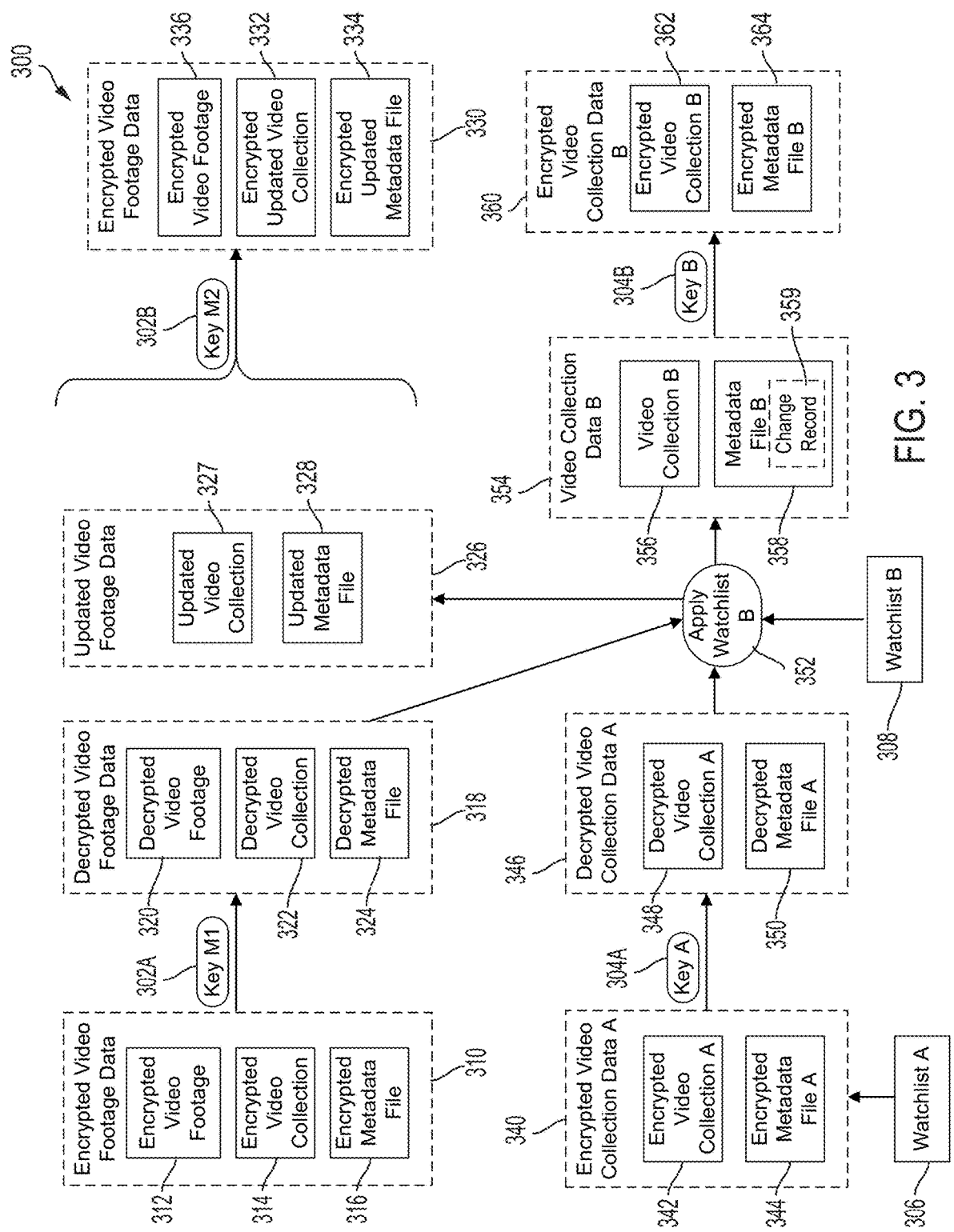
FIG. 3 illustrates a block diagram showing an example for how an updated watchlist of a user can be applied to a previously captured video footage, according to some embodiments.

FIG. 3 illustrates a block diagram 300 showing an example for how an updated watchlist 308 (e.g., watchlist B) of a user can be applied to a previously captured video footage, according to some embodiments. For ease of reference, the following descriptions may refer to one or more components described above with respect to FIG. 1A. As shown in diagram 300, the previously captured video footage may be encrypted and stored in encrypted video footage data 310. For example, as described with respect to FIG. 2, video managing system 120 may generate encrypted video footage data 310 including encrypted video footage 312, encrypted video collection 314, and encrypted metadata file 316.

In some embodiments, to apply updated watchlist 308 to the previously captured video footage, video managing system 120 may first need to access decrypted video data. Accordingly, video managing system 120 can apply a key 302A (key M1) received from authorization system 150 to decrypt encrypted video footage data to generate decrypted video footage data 318. Decrypted video footage data 318 includes decrypted video footage 320, decrypted video collection 322, and decrypted metadata file 324, which are decrypted versions of encrypted video footage 312, encrypted video collection 314, and encrypted metadata file 316.

In some embodiments, a previous watchlist 306 (i.e., watchlist A) associated with the user may have been applied on the previously captured video footage to generate encrypted video collection data A 340 including encrypted video collection A 342 and encrypted metadata file A 344, as described above with respect to FIG. 2. For example, encrypted video collection A may include encrypted copies of portions of the video footage that include one or more approved targets specified in watchlist A 306. In some embodiments, video managing system 120 can apply a key A 304A associated with the user to decrypt encrypted video collection data A to generate decrypted video collection data A 346 including decrypted video collection A 348 and decrypted metadata file A 350.

In some embodiments, video managing system 120 can apply updated watchlist B 308 to decrypted video collection data A 346 and decrypted video footage data 318 to generate video collection data B 354 including video collection B 356 and metadata file B 358. In some embodiments, video collection B 356 can include one or more copies of portions of the video footage (e.g., one or more video segments, one or more video frames, etc.) that include one or more events approved in updated watchlist 308 and that do not include any disapproved event in updated watchlist 308. In some embodiments, video managing system 120 can apply updated watchlist B 308 directly to decrypted video footage data 318. For example, video managing system 120 may search an events or features index in decrypted metadata file 324 to identify one or more portions of decrypted video footage 320 or one or more video segments in decrypted video collection 322 that meets the criteria of updated watchlist B 308. In some embodiments, video managing system 120 can modify decrypted video collection A 348 to generate video collection B 356.

For example, as shown and described with respect to FIG. 2, watchlist A 306 and updated watchlist B 308 may correspond to watchlists 240A and 240B, respectively. Accordingly, decrypted video collection A 348 may include video segments 210B and 210E including event B and generated video collection B 356 may additional video segments as shown in video collection 242B to include video segments showing event A. In a law enforcement scenario, event B may represent an arrested individual and event A may represent the individual's attorney. If both events A and B are captured in video, law enforcement may not be permitted to view or listen in on such video due to attorney-client privileges. In the rare circumstance that the courts determines that the attorney-client privilege does not apply, a surveillance user from law enforcement may be granted an updated watchlist 308 to view additional video content in which both events A and B are detected in the same time frame.

Similarly, video managing system 120 can generate metadata file B 358 that includes an index of events indicated updated watchlist B 308. In some embodiments, video managing system 120 can generated metadata file B 358 based on decrypted metadata file 324. In some embodiments, metadata file B 358 includes change records 359 that indicate a change between decrypted video collection data A 346 and video collection data B 354 to provide an audit record.

In some embodiments, video managing system 120 can further encrypt generated video collection data B 354 using key B 304B associated with the user to generate encrypted video collection data B including encrypted video collection B 362 and encrypted metadata file B 364 corresponding to encrypted versions of video collection B 356 and metadata file B 358, respectively. In some embodiments, key B 304B may be the same as key A 304A.

In some embodiments, should updated watchlist B 308 include events not originally detected in the video footage, video managing system 120 can be configured to generate updated video footage data 326 including updated video collection 327 and updated metadata file 328. In some embodiments, to re-secure decrypted video footage data, video managing system 120 can apply key M2 302B to generate encrypted video footage data 330. In some embodiments, encrypted video footage data 330 can include encrypted video footage 336, encrypted updated video collection 332, and encrypted updated metadata file 334, which correspond to encrypted versions of decrypted video footage 320, updated video collection 327, and updated metadata file 328. In some embodiments, key M2 302B can be provided by authorization system 150 and is different than the original key used to generated encrypted video footage data 310. In some embodiments, once encrypted, video managing system 120 cannot decrypt encrypted video footage data 330 using key M2 302B when implementing an asymmetric encryption scheme.

Figure 4:
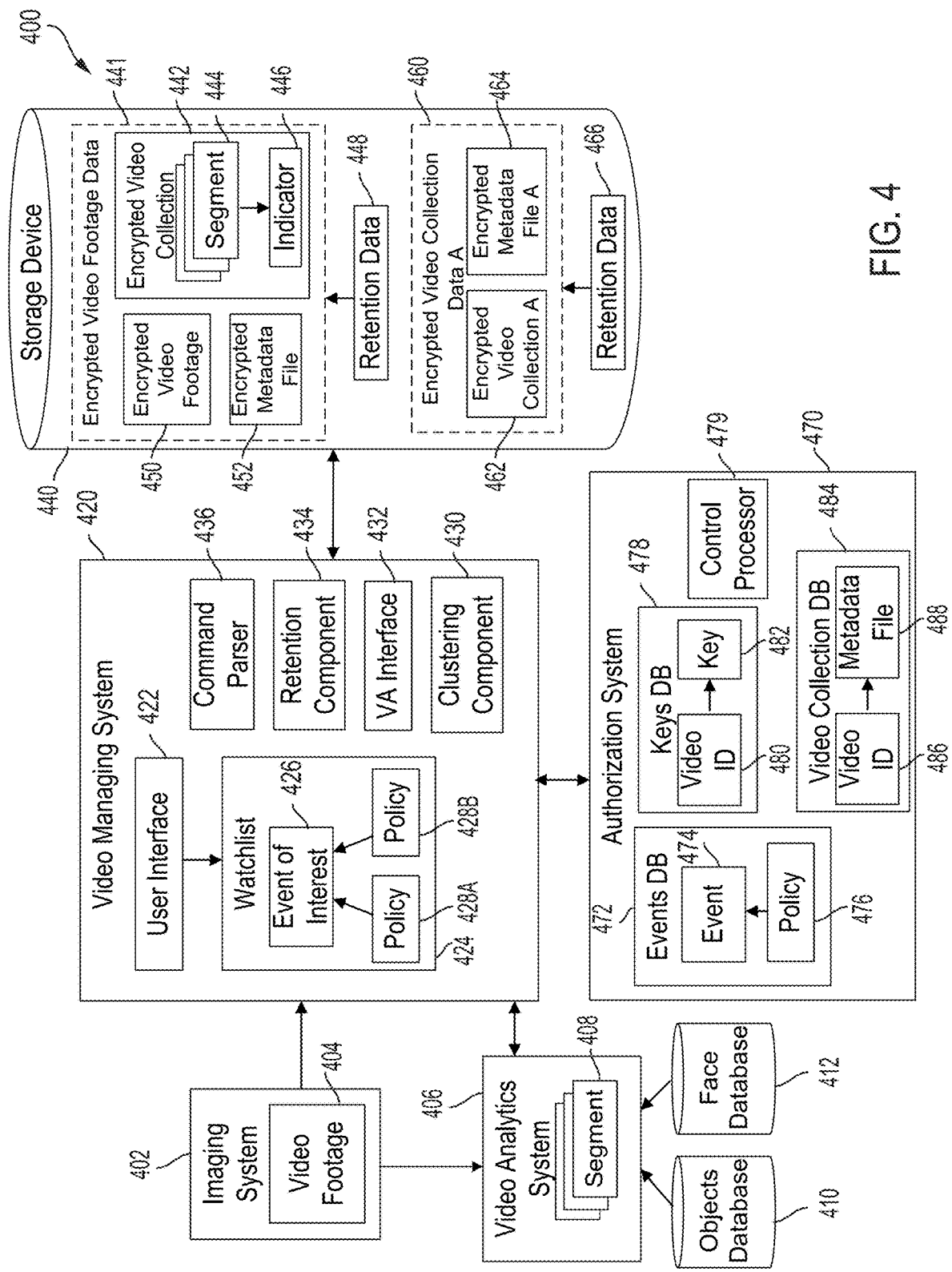
FIG. 4 illustrates a block diagram of a system for authorizing and executing video surveillance, according to some embodiments.

FIG. 4 illustrates a block diagram of a system 400 for authorizing and executing video surveillance, according to some embodiments. System 400 includes an imaging system 402, a video analytics system 406, a video managing system 420, an authorization system 470, and a storage device 440. In some embodiments, video managing system 420, video analytics system 406, authorization system 470, and storage device 440 may correspond to similarly named video managing system 120, video analytics system 112, authorization system 150, and storage device 130, respectively. In some embodiments, as described above with respect to FIG. 1B, video managing system 420 and video analytics system 406 can be implemented in an integrated video managing system.

In some embodiments, imaging system 402 can include one or more security cameras such as security cameras 106A-D or security cameras 106E-I as described above in FIGS. 1A and 1B, respectively. For example, imaging system 302 may include an IP camera configured to communicate with video managing system 420 through an IP network. In some embodiments, imaging system 402 can include a surveillance network of security cameras. In some embodiments, a security camera in imaging system 402 can generate video footage 404 that includes video content captured within a field of view of an area under surveillance by the security camera. In some embodiments, video footage 404 can be stored in a video format to represent a plurality of video frames tagged by metadata such as timestamps indicating when the video content was captured. Accordingly, video footage 404 can include a plurality of video frames. In some embodiments, imaging system 402 can tag video footage 404 with metadata indicating an identifier of a security camera generating video footage 404 or one or more indicators of a location of the area under surveillance by the security camera.

In some embodiments, video footage 404 can be stored and transmitted according to one or more video formats such as H.264, MJPEG, MPEG-4, MPEG-2, HEVC (H.265), etc. In some embodiments, imaging system 402 can be configured to transmit video footage 404 to video managing system 420 or video analytics system 406 through a network (e.g., network 102 of FIG. 1A). In some embodiments, video footage 404 can be transmitted as a live video stream in real time or near real time. In other embodiments, video footage 404 can be transmitted as recorded video, as described above with respect to security cameras 106A-I in FIGS. 1A-B.

In some embodiments, video managing system 420 receiving video footage 404 can be configured to request video analytics system 406 to parse video footage 404 into a plurality of video segments 408. For example, video managing system 420 may forward the received video footage 404 to video analytics system 406 through a network (e.g., network 102). In other embodiments, video footage 404 may be directly transmitted to video analytics system 406 for processing.

In some embodiments, video analytics system 406 can be configured to generate a plurality of video segments 408 based on the received video footage 404 such that each video segment includes related video content. In some embodiments, video analytics system 406 can analyze each video segment to select one or more video frames that are representative of each video segment. In some embodiments, video analytics system 406 can further analyze the one or more video frames to extract one or more features to associate with the video segment. For example, the one or more features may include colors, shapes, objects, classes of objects, etc.

In some embodiments, video analytics system 406 can be configured to apply video analytics to detect one or more events of interest within video footage 404 and generate a video segment of video frames that are detected to include the one or more events of interest. In some embodiments, each video segment include a plurality of video frames within a predefined period of time that include one or more events of interest in common as detected by video analytics system 406. In some embodiments, video analytics system 406 can be configured to detect events of interests in the video frames of video footage 404 based on a plurality of watchlists supplied by video managing system 420 or authorization system 470.

In some embodiments, as shown in video managing system 420, a watchlist 424 can include one or more events of interest such as event of interest 426 that is associated with one or more processing policies 428A-B. As will be further described below, processing policies 428A-B include information that controls how video content that contains event of interest 426 should be processed. For example, processing policies 428A-B may control whether the video content should be referred to users for immediate review, whether the video content can be retained on storage device 240 for long term storage, and if so, for how long the video content should be retained on storage device 240. Additionally, processing policies 428A-B may include a collection policy that dictates which portions of video footage 404 are viewable by a surveillance user. In some embodiments, the collection policy associated with event 426 can include one or more surveillance parameters such as one or more approved locations for surveillance and one or more time periods for surveillance.

In some embodiments, watchlist 424 can include one or more classes of objects or object motion. For example, event of interest 426 may include a presence or motion within a field of view of the following: one or more persons, one or more vehicles, one or more aircraft, one or more busses, one or more trucks, one or more bicycles, one or more weapons, luggage, one or more backpacks, one or more hats, etc. In other examples, event of interest 426 may be a class of motion or activities such as a running person, bending down, a falling person, etc.

In some embodiments, watchlist 424 can include one or more specific objects or activities within a field of view. For example, event of interest 426 may include a specific vehicle identified by a license plate, a specific type of weapon, a person performing a specific activity or motion, etc. In some embodiments, event of interest 426 can include one or more specific persons of interest. In these embodiments, reference images of a person of interest may need to be supplied by the user.

In some embodiments, watchlist 424 can include one or more objects or persons characterized by one or more descriptors. For example, event of interest 426 may indicate one or more vehicles of a specific make, model, color, or a combination thereof, each of which are example descriptors. In another example, event of interest 426 may indicate one or more persons meeting criteria required by one or more descriptors. In these example, the one or more descriptors for persons may include a designated hat color, a hair color, upper garment type or color, lower garment type or color, a height range, a gender, accessories like glasses or rings, a tattoo, etc. In some embodiments, watchlist 424 effectively can act as a filter on captured video content such that only video content that includes the characteristics of unknown persons of interest are retained and subsequently forwarded to authorized users for manual review.

In some embodiments, watchlist 424 can include a whitelist or a blacklist. In some embodiments, the whitelist includes a plurality of events of interest whose captured video content should be retained or referred for review. For example, in a public or national security context, the whitelist may include a plurality of individuals of investigative interest. For example, common whitelists may include the Terrorist Screening Centers Terrorist Watchlist, the State Department's Arms Export Control Act (AECA) Debarred List and U.S. Denied Persons List, the FBI's Ten Most Wanted List, or Wanted Persons listed maintained by the FBI for whom open judicial warrants exist. In other contexts such as at fundraising events in politics, sports, or at universities, a whitelist may include prominent donors or family members of these donors which fundraisers may be particularly interested in tracking. In yet other contexts such as in a commercial context, the whitelist may include a list of VIP customers or important personnel that should be tracked.

In contrast, a blacklist may include a plurality of events of interest whose captured video content should not be retained, according to some embodiments. For example, in a commercial context, the blacklist may include employees expected to be regularly present at surveilled locations and whose image as captured by security cameras should not be retained. In a residential context such as at an apartment complex, security personnel may be concerned with protecting privacy of residents and may generate the blacklist of residents at the apartment complex such that video content captured of residents do not require review, collection, nor storage. In this context, security guards are more concerned with monitoring unknown persons, which may be indicated in a whitelist.

Accordingly, video analytics system 406 can run video analytics on one or more video frames of video footage 404 to generate a plurality of video segments 408 based on events of interest identified in one or more watchlists including, for example, watchlist 424. As described above, an event of interest may include a presence or motion of a class of objects such as persons, vehicles, weapons, etc. The event of interest may also include a presence or motion of a specific type of object or persons characterized by one or more descriptors or specific objects or persons of interest. For example, such an event of interest may include a red vehicle, a vehicle with a specific license plate, a particular make or model of vehicle, etc.

In some embodiments, video analytics system 406 can be configured to implement one or more object detection algorithms to detect one or more events of interest including a presence of a class of objects or specific objects within video frames of video footage 404. In some embodiments, an object detection algorithm can include one or more machine learning algorithms such as Convolution Neural Networks (CNNs), Region-based CNN (R-CNN), Fast R-CNN, Faster R-CNN, YOLO, etc. In some embodiments, reference images for objects or extracted features for objects can be stored in objects database 410. In some embodiments, video analytics system 406 can run one or more object detection algorithms to generate feature results and compare the feature results with those stored in objects database 410 to detect a class of objects or a specific object.

In some embodiments, video analytics system 406 can be configured to implement one or more facial recognition algorithms to detect a presence of one or more persons or to detect one or more specific persons of interest within video frames of video footage 404. In some embodiments, the one or more facial recognition algorithms can be configured to detect faces, extract features from a detected face, and match the extracted features to a face database 412 of face features to identify one or more specific persons. In some embodiments, the one or more facial recognition algorithms can include one or more machine learning algorithms such as those described above for object detection and/or principal component analysis (PCA) using eigenfaces, linear discriminant analysis (LDA), elastic bunch graph matching using the Fisherface algorithm, a hidden Markov model, multilinear subspace learning using tensor representation, neuronal motivated dynamic link matching, or a combination of two or more algorithms. In some embodiments, video analytics system 406 can be configured to train one or more of its machine learning algorithms based on a plurality of reference images of a person of interest to permit detection of that person in one or more video frames of video footage 404.

In some embodiments, video analytics system 406 can be configured to apply one or more object recognition or facial recognition algorithms on video footage 404 to segment video footage 404 into a plurality of video segments 408. In some embodiments, each video segment can include a plurality of video frames that have been determined by video analytics system 406 to include an event of interest. In these embodiments, video analytics system 406 can be configured to tag the video segment with metadata indicating presence of the detected event of interest. In some embodiments, the metadata may include one or more indicators for one or more detected events of interest and one or more corresponding confidence scores.

In some embodiments, during review of video footage 404, video analytics system 406 can initiate a start of a video segment associated with an event of interest in response to detecting the event of interest in the video footage 404. In some embodiments, while the event of interest is detected in following video frames of video footage 404 within a predetermined period of time, additional video frames may be added to the video segment. In some embodiments, video analytics system 406 can determine an end of the video segment in response to determining that the event of interest has not been detected in video footage 404 within a period of time. In some embodiments, to add buffer time to the video segment, video analytics system 406 can be configured to add one or more time buffers so that the delimited video segment begins a first period of time (e.g., minutes) before the event of interest is detected and ends a second period of time (e.g., minutes) after the event of interest is no longer being detected.

In some embodiments, object and facial recognition algorithms operate on a probabilistic basis and provide a confidence score (e.g., 80%) for each indicator of a detected event of interest indicating how likely that event of interest was accurately classified or detected. As described above, an event of interest may indicate a presence of a class of objects or specific objects or persons of interest. Therefore, a video segment that is tagged with three indicators for three detected events of interest may be tagged with three corresponding confidence scores. In this example, the three indicators may include a first indicator of presence of one or more persons detected in the video segment, a second indicator of a presence of a specific person of interest detected in the video segment, and a third indicator of a presence of one or more weapons detected in the video segment. In some embodiments, video analytics system 406 can be configured to tag each of video segments 408 with one or more indicators having a confidence score above a predefined threshold value. In other words, video analytics system 406 may be configured to filter video segments from being transmitted to video management system 420 depending on whether the confidence score is above a predefined threshold value.

In some embodiments, authorization system 470 can be configured to control and enforce compliance of video surveillance performed by video managing system 420 in accordance with video collection policies. In some embodiments, authorization system 470 can include a control processor 479 that configures and manages each of events database 472, keys database 478, and video collection database 484.

In some embodiments, authorization system 470 can include an events database 470 that associates each event 474 with one or more policies 476. In some embodiments, events database 470 can store one or more watchlists approved by an authorization user having access to authorization system 470. For example, a surveillance user may submit requested additions or deletions from watchlist 424 and the authorization user may approve the request to configure events database 472. In some embodiments, control processor 479 can forward an approved watchlist from events database 472 for use by video managing system 420. Accordingly, in some embodiments, only authorized users of authorization system 470 can control a collection policy for an event of interest to control surveillance parameters for collecting video content of that event of interest.

In some embodiments, authorization system 470 can include a keys database 478 that includes one or more keys 482 for each video ID 480 indicating a video footage or a security camera generating the video footage. In some embodiments, a key 482 for video ID 480 can be used by video managing system 420 to encrypt video footage 404 identified by video ID 480 such that surveillance users of video managing system 420 cannot access video footage 404 once encrypted. Control processor 479 can control when video managing system 420 is permitted to decrypt encrypted video footage data 441. As described above with respect to FIG. 3, to permit an surveillance user to decrypt, for example, encrypted video footage 450, control processor 479 can transmit a decryption key (e.g., a private key in a key pair) associated with video ID 480 to video managing system 420. In some embodiments, control processor 479 can also transmit a new public key of a new key pair associated with video ID 480 to video managing system 420 to re-encrypt decrypted video footage data. Accordingly, video managing system 420 would need to request access to a private key stored with video ID 480 to access encrypted video footage data 441.

In some embodiments, authorization system 470 can include a video collection database 484 that includes one or more metadata files 488 for each video ID 486 indicating a video footage or a security camera generating the video footage. In some embodiments, metadata file 484 may by generated by video managing system 420 for video footage 404, as described above with respect to FIGS. 2-3. For example, metadata file 484 may include an index of events of interest and portions of the video footage at which each event is detected. Metadata file 484 may also include information that describe the video segments or video clusters of a video collection generated from video footage 404. In some embodiments, authorization system 470 can be configured to transmit metadata file 488 to video managing system 420 to permit a surveillance user authorized by authorization system 470 to analyze previously encrypted video footage data 441. For example, the indexes stored in metadata file 488 may permit video managing system 420 to more efficiently search for events of interest in a decrypted video footage.

In some embodiments, video managing system 420 can be configured to perform targeted video surveillance processing and collection of video footage 404 based on one or more watchlists such as watchlist 424 and as controlled by authorization system 470. In some embodiments, communications between video managing system 420 and authorization system 470 can be encrypted to prevent man in the middle attacks on sensitive data such as keys 482. In some embodiments, to process video footage 404, video managing system 420 can include a user interface 422, a clustering component 430, a video analytics (VA) interface 432, a retention component 434, and a command parser 436. In some embodiments, video managing system 420 can be implemented on one or more servers centrally located or distributed across a network. In other embodiments, video managing system 420 can be implemented on one or more cloud servers in a cloud platform.

In some embodiments, VA interface 432 is configured to communicate with video analytics system 406. For example, video managing system 420 may receive video footage 404 from imaging system 404 and VA interface 432 may route video footage 404 to one or more video analytics systems such as video analytics system 406. In some embodiments, VA interface 432 can then receive video segments 408 tagged with metadata as generated by video analytics system 408. In some embodiments, VA interface 432 can be configured to transfer a copy of a plurality of watchlists to video analytics system 406 to control which types of events of interest video analytics system 406 is to detect. As described above, watchlists such as watchlist 424 include a plurality of events of interest such as event of interest 426. In some embodiments in which an integrated video managing system 405 includes video analytics system 406, VA interface 432 may be an optional component.

In some embodiments, user interface 422 can be configured to permit surveillance users to access watchlist 424 stored on video managing system 420 as well as to access, from storage device 440, encrypted video collection data 460 associated with a surveillance user. In some embodiments, user interface 422 can be provided as a web application or a web portal to the user who can access user interface 422 through a user device capable of connecting to a network (e.g., the Internet) accessed by video managing system 420. In some embodiments, user interface 422 can prompt a user to enter login credentials to authenticate the user before permitting access to watchlist 424 or to view video content of encrypted video collection data 460 stored on storage device 440. In some embodiments, user interface 422 can be configured to restrict how the user can interact with watchlist 424 based on an access privileged possessed by the user. For example, user interface 422 may permit a first user having a read-only access to view event of interest 226 and associated processing policies 428A-B, but does not permit any changes to watchlist 424. In another example, user interface 422 may permit a second user having a limited access to assign a restricted set of processing policies to events of interest. In another example, user interface 422 may permit a third user having access to request changes to collection policy to authorization system 470. For example, the third user may be granted a court order, a warrant, or target consent to add or remove events of interest from watchlist 424. In some embodiments, video managing system 420 can be configured to forward the request to authorization system 470. Upon approval by authorization system 470, video managing system 420 can update watchlist 424.

In some embodiments, clustering component 430 can be configured to generate a plurality of clusters of related video segments from video segments 408 received from video analytics system 406. In some embodiments, clustering component 430 can be configured to aggregate a plurality of video segments that have one or more indicators in common into a video cluster. For example, clustering component 430 may compare metadata between video segments 408 to determine which video segments have one or more indicators in common. In some embodiments, each video cluster can be associated with a unique combination of a plurality of indicators. Therefore, it is possible for two video clusters to include the same video segment if that video segment tagged with one or more indicators contained in both of the two video clusters.

In some embodiments, command parser 436 can be configured to generate a video collection of video segments or clusters based on received video footage 404 by detecting a plurality of events indicated by authorization system 470. In some embodiments, as described above with respect to FIGS. 2-3, command parser 436 can encrypt video footage data 441 for storing in storage device 440 using a first key (e.g., key 482) associated with video footage 404. For example, encrypted video footage data 441 stored on storage device 440 can include encrypted video footage 450, encrypted metadata file 452, and encrypted video collection 441. As shown, encrypted video collection 441 may include a plurality of video segments 444 or clusters of segments and one or more associated indicator 446 for the detected event(s) of interest. In some embodiments, command parser 436 can also apply one or more processing policies 428A-B to store video footage data based on watchlist 424. For example, storage device 440 may store retention data 448 with encrypted video footage data 441 that controls a storage retention period.

In some embodiments, as described above with respect to FIG. 1A, one or more processing policies 428A-B may include a referral policy, a retention policy, a collection policy, or a combination thereof. For example, the referral policy may indicate that the video content be referred to human analyst immediately (i.e., an immediate alert), flagged for later review (i.e., a delayed alert), or not alerted at all. For example, the retention policy may indicate whether the video content is authorized for retention and should be retained or deleted. In an example, the retention policy may indicate a period of time (e.g., a number of days, weeks, months, years, etc.) to retain video content in storage device 440. In an example, the retention policy may indicate a retention date to retain the video content in storage device 440, after which the video content should be deleted. For example, the collection policy may indicate one or more surveillance parameters for an approved event of interest.

In some embodiments, command parser 436 can be configured to generate a video collection for a surveillance user. The video collection can include a copy of a plurality of portions of video footage 404 that are detected to include one or more approved events of watchlist 424 associated with the surveillance user. In some embodiments, command parser 436 can generate a metadata file associated with the generated video collection and that describe the video segments or clusters stored in the video collection. In some embodiments, the metadata file includes an index of events and that associates each event with one or more portions of video footage 404 at which that event can be viewed and is detected. In some embodiments, command parser 436 can encrypt and store the video collection 462 and associated metadata file 464 as encrypted video collection data A 460 on storage device 440. In some embodiments, command parser 436 can apply an encryption key possessed by the surveillance user to generate encrypted video collection data 460 such that other users that do not possess the encryption key cannot access video contents of encrypted data. Other examples of keys and the encryption and decryption process were described above with respect to FIGS. 2-3.

In some embodiments, retention component 434 can be configured to manage retention and deletion of video content stored in storage device 440. In some embodiments, retention component 434 can be configured to periodically, on demand, or requested by storage device 440 to check the retention policy (e.g., retention data 448 and 466) of video content (e.g., encrypted video footage data 441 and encrypted video collection data 460) stored on storage device 440 to determine whether to delete or request storage device 440 to delete expired video content.

In some embodiments, storage device 440 can correspond to storage device 130 of FIG. 1A. Like storage device 130, storage device 440 can be configured to provide long term storage of video content. In some embodiments, storage device 440 can receive video footage, video collections, video clusters, metadata files, and encrypted versions thereof from video management system 420. Then, storage device 440 may store the received video data in association with respective retention data 448 and 466 controlling how long each video data is to be retained in storage device 440. In some embodiments, storage device 440 can be configured to delete video data, e.g., encrypted video collection data A 460, whose retention data 466 indicates that associated video data should not be retained any longer.

Figure 5:
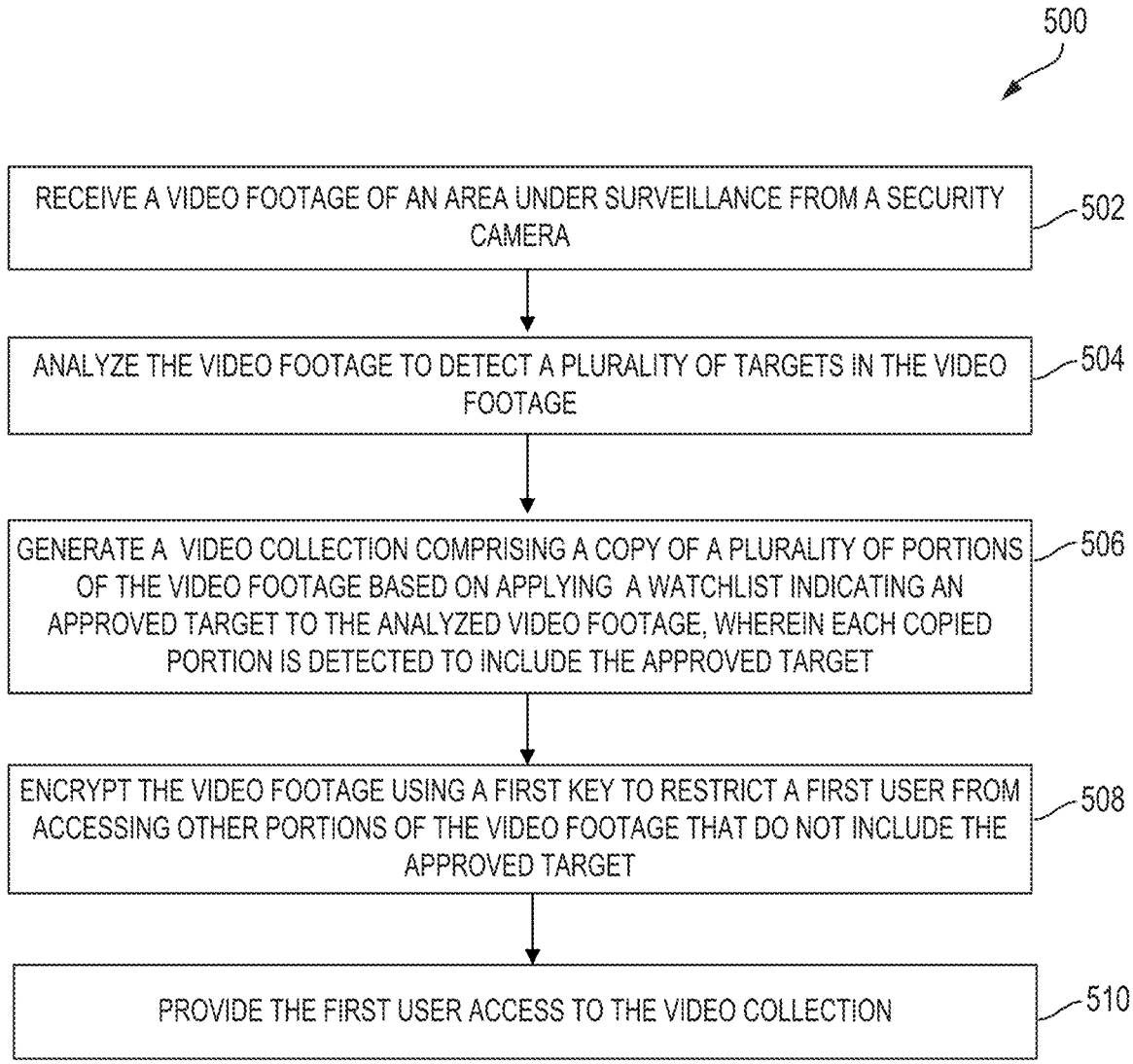
FIG. 5 illustrates a flowchart of a method for limiting video surveillance to authorized uses, according to some embodiments.

FIG. 5 illustrates a method 500 for limiting video surveillance to authorized uses, according to some embodiments. In some embodiments, a surveillance system (e.g., video managing system 101 of FIG. 1A) or a video management system (e.g., video managing system 120) in the surveillance system can be configured to perform one or more steps of method 500.

In step 502, the surveillance system receives a video footage of an area under surveillance from a security camera. In some embodiments, the video footage can be received as a video stream or as recorded video footage. In some embodiments, the video footage can be tagged with metadata including, for example, one or more location indicators, data identifying the security camera, timestamps, etc. In some embodiments, the metadata includes a location indicator that identifies the area under surveillance. For example, the location indicator may be a GPS coordinate, a landmark, a street name, an address, etc.

In step 504, the surveillance system analyzes the video footage to detect a plurality of events in the video footage. In some embodiments, the plurality of events can include classes of targets such as persons, vehicles, weapons, etc. In some embodiments the plurality of events can include specific targets such as a specific person of interest, a specific vehicle as identified by a license plate, etc. As described above with respect to FIG. 1A, the surveillance system can partition the video footage into a plurality of video segments and select one or more representative video frames for each video segment to capture prominent features detected in the video segment. In some embodiments, the surveillance system can also tag each video segment with any associated detected targets.

In some embodiments, the surveillance system can generate a metadata file that includes an index of features to map detected features to which portions of the video footage in which each feature is detected. Similarly, the surveillance system can generate the metadata file to include an index of targets to map detected targets to which portions of the video footage in which each target is detected. For example, the surveillance system may associate each target with one or more video frames, one or more video segments, one or more video clusters, one or more time ranges in the video footage, or a combination thereof.

In step 506, the surveillance system generates a video collection comprising a copy of a plurality of portions of the video footage based on applying a watchlist indicating an approved event to the analyzed video footage, wherein each copied portion is detected to include the approved event. In some embodiments, the surveillance system can generate the video collection using the metadata file. For example, the surveillance system may search the index of events in the metadata file to identify the plurality of portions of the video footage that captured video of the approved event. Then, the surveillance system may copy the plurality of identified portions to the video collection.

In step 508, the surveillance system encrypts the video footage using a first key to restrict a first user from accessing other portions of the video footage that do not include the approved event.

In some embodiments, the first key is not accessible by the first user. In some embodiments, after encrypting the video footage, the surveillance system can transmit the first key to an authorization system configured to store and secure keys for decrypting encrypted video footages. In some embodiments, the surveillance system may receive a notification from the authorization system indicating that the first key was received and secured. After receipt of this notification, the surveillance system can be configured to irrecoverably delete the first key from the surveillance system to prevent any user having access to the surveillance system from recovering the deleted first key. For example, the surveillance system may delete the first key from its memory, wipe a memory location storing the deleted first key, overwrite the memory location, etc.

In some embodiments, the first key may be part of a key pair used to encrypt and decrypt video data and managed by the authorization system. In some embodiments, the key pair includes a public key for encrypting video data and includes a private key for decrypting encrypted video data. In these embodiments, the first key corresponds to the public key used by the surveillance system to encrypt the video footage, but which cannot be used to decrypt the video footage once encrypted. As described above, the authorization system can store the private key, which cannot be accessed by the surveillance system. Accordingly, once the surveillance system encrypts the video footage using the first key (i.e., the public key), the surveillance system cannot decrypt the encrypted video footage.

In step 510, the surveillance system provides the first user access to the video collection. In some embodiments, the video collection can be stored in a storage device in an unencrypted format. Therefore, the first user having access to the storage device will be able to access and view the video collection of the approved target indicated in the watchlist.

In some embodiments, the video collection can be encrypted with a second key associated with the first user before being stored in the storage device. By doing so, only users such as the first user having access to the second key will be able to decrypt and access video contents in the encrypted video collection. In some embodiments, the second key may be a public key in a key pair including the public key and the private key. In these embodiments, only users such as the first user having access to the private key associated with the second key will be able to decrypt the encrypted video collection.

Figure 6:
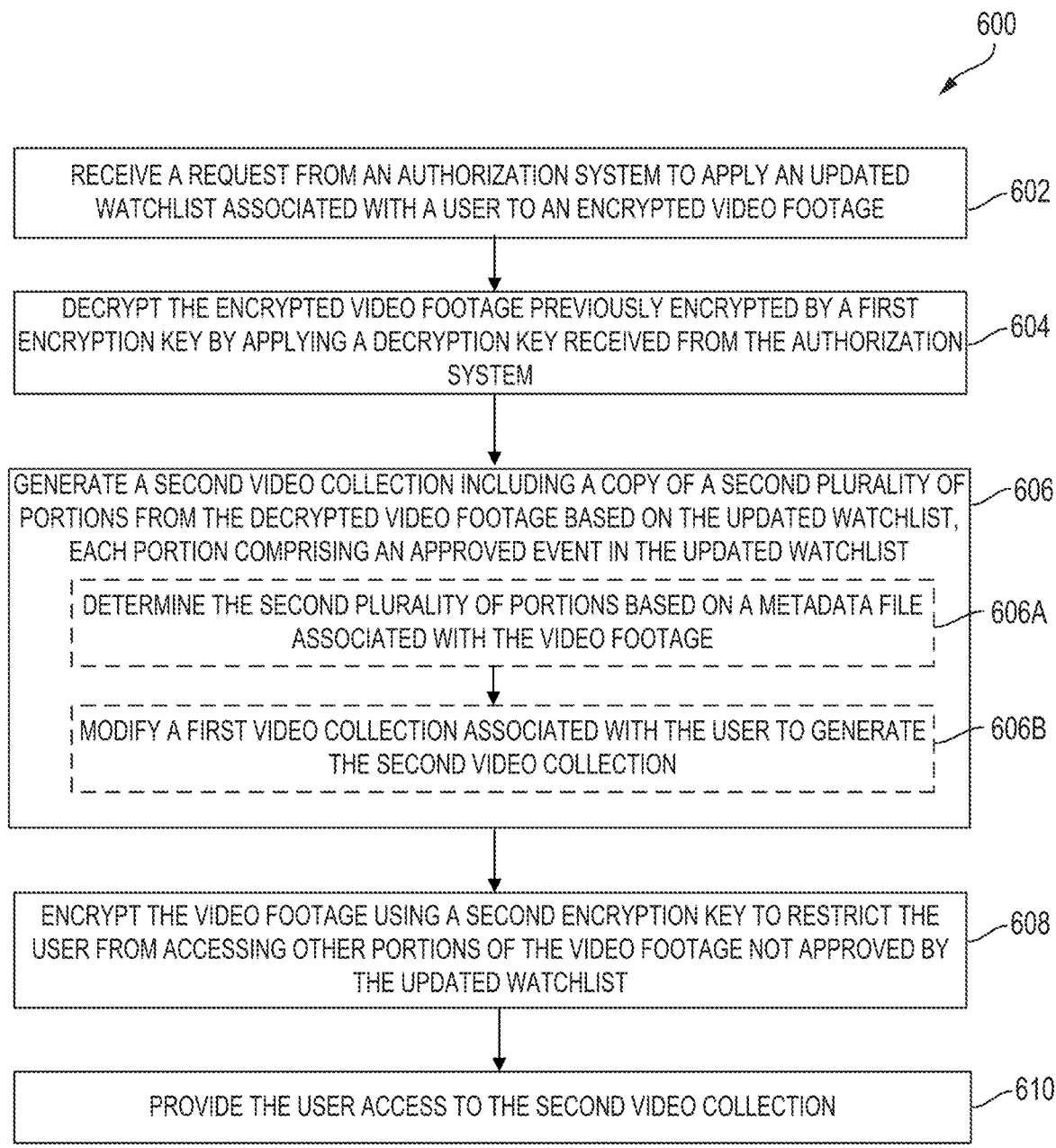
FIG. 6 illustrates a flowchart of a method for authorizing video surveillance on previously collected video footage controlling, according to some embodiments.

FIG. 6 illustrates a flowchart of a method for authorizing video surveillance on previously collected video footage controlling, according to some embodiments. In some embodiments, a surveillance system (e.g., video managing system 101 of FIG. 1A) or a video management system (e.g., video managing system 120) in the surveillance system can be configured to perform one or more steps of method 600.

In step 602, the surveillance system receives a request/direction from an authorization system to apply an updated watchlist associated with a user to an encrypted video footage. For example, as described above with respect to FIG. 5, a first watchlist associated with the user may have been previously applied to an unencrypted video footage. In this example, the updated watchlist may represent a modified version of the first watchlist.

In some embodiments, similar to the first watchlist, the updated watchlist may include one or more targets and one or more respective collection policies. In some embodiments, a collection policy associated with a target specifies the parameters under which captured video of that target may be accessed. In some embodiments, the updated watchlist includes a second approved target whose captured video is authorized for viewing by the user. In some embodiments, the updated watchlist includes a disapproved target whose captured video is not authorized for viewing by the user. In these embodiments, the surveillance system can be configured to remove portions of video from a first video collection associated with the user to comply with the updated watchlist, as will be further described below.

In step 604, the surveillance system decrypts the encrypted video footage previously encrypted by a first encryption key by applying a decryption key received from the authorization system. For example, as described above with respect to FIGS. 2-3, the first encryption key and the decryption key may be a public key and a private key, respectively, of a key pair managed by the authorization system.

In step 606, the surveillance system generates a second video collection including a copy of a second plurality of portions from the decrypted video footage based on the updated watchlist, wherein each portion comprises an approved event in the updated watchlist. In some embodiments, step 606 can include one or more of steps 606A-B.

In step 606A, the surveillance system determines the second plurality of portions based on a metadata file associated with the video footage. For example, the metadata file may have been previously generated when the originally received video footage was analyzed, as described above with respect to FIG. 5. In some embodiments, the metadata file includes an index that identifies portions of the video footage in which each event is detected. Accordingly, the surveillance system may search the index to identify a plurality of portions of the video footage that include one or more approved events in the updated watchlist. Similarly, the surveillance system may search the index to identify portions of the video that include one or more disapproved events in the updated watchlist to prevent these portions from being viewable to the user.

In step 606B, the surveillance system modifies the first video collection associated with the user to generate the second video collection. In some embodiments, the surveillance system can copy the second plurality of portions to the first video collection. In some embodiments, the surveillance system can redact or discard portions of the first video collection that include one or more disapproved events indicated in the updated watchlist.

In some embodiments, the surveillance system may have previously generated a metadata file for the first video collection. In these embodiments, the surveillance system can update the metadata file by updating a stored index and/or update a change file indicating changes made between the first video collection and the second video collection.

In step 608, the surveillance system encrypts the video footage using a second encryption key to restrict the user from accessing other portions of the video footage not approved by the updated watchlist. In some embodiments, the surveillance system encrypts the video footage using a second encryption key different than the first encryption key of step 604.

In some embodiments, the surveillance system can generate the second encryption key. In these embodiments, the surveillance system can transmit the second encryption key to the authorization system. Subsequently, in response to receiving a notification from the authorization system indicating that the second encryption key was received and secured, the surveillance system can irrecoverably delete the second encryption key.

In some embodiments, the surveillance system receives the second encryption key with the decryption key from the authorization system. In these embodiments, the second encryption key may be a public key of a second key pair including the public key and a private key that can decrypt data encrypted by the public key. In some embodiments, the authorization system can be configured to manage the second key pair and the surveillance system has no access to the private key of the second key pair. Accordingly, once the surveillance system encrypts the video footage using the second encryption key, the surveillance system will not be able to decrypt the encrypted video footage and thereby prevents the user from accessing video content from the encrypted video footage.

In step 610, the surveillance system provides the user access to the second video collection. As described above, the second video collection may be encrypted by a crypto key associated with the user to prevent other users from accessing video content stored in the second video collection. Additionally, the updated metadata file associated with the second video collection may also be encrypted by the crypto key.

Figure 7:
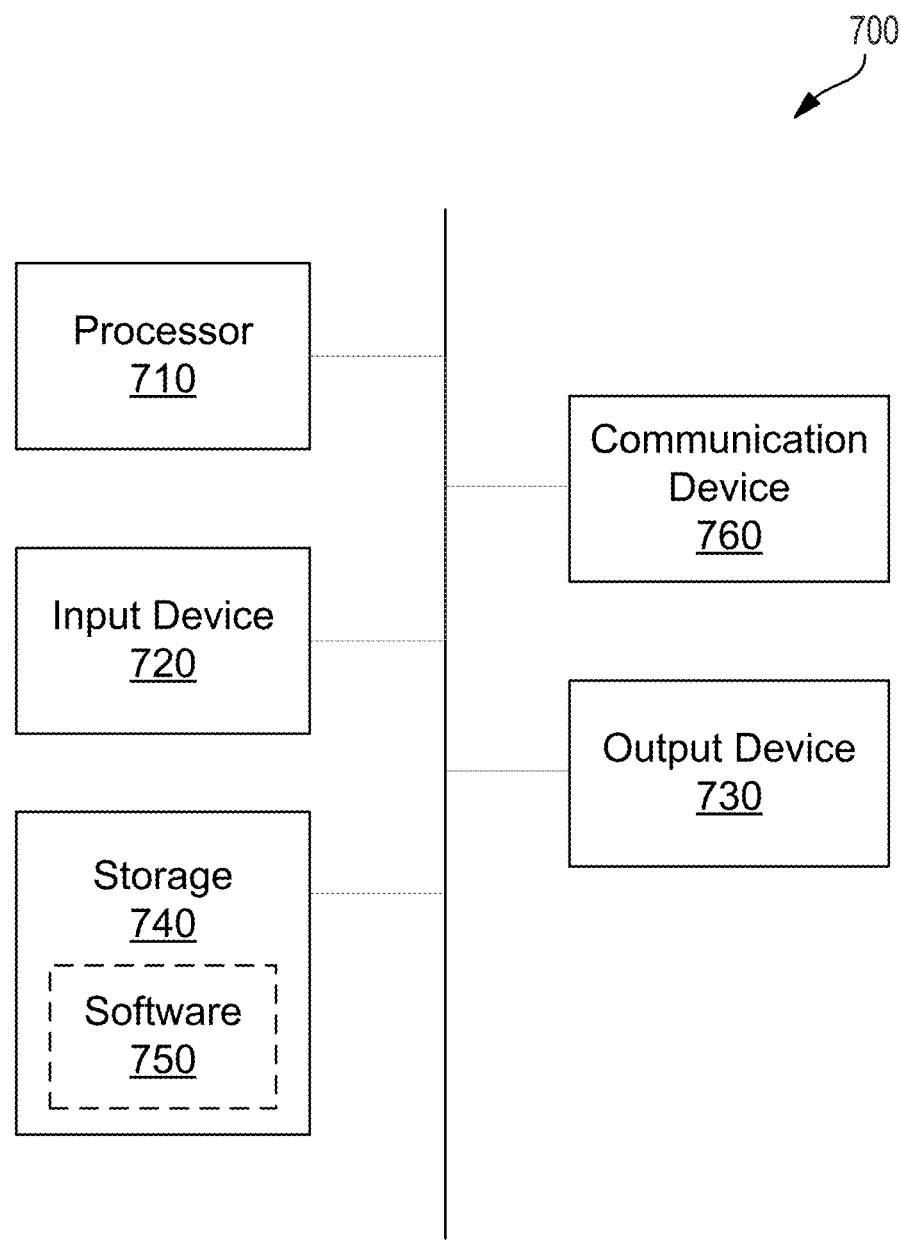
FIG. 7 illustrates an example of a computer, according to some embodiments.

FIG. 7 illustrates an example of a computing device 700, according to some embodiments. Device 700 can be a host computing device connected to a network. For example, device 700 may be an example implementation of one or more of the devices or systems described above with respect to FIGS. 1A-B and 4. Device 700 can be a client computer or a server. As shown in FIG. 7, device 700 can be any suitable type of microprocessor-based device, such as a personal computer, work station, or server. The device can include, for example, one or more of processor 710, input device 720, output device 730, storage 740, and communication device 760. Input device 720 and output device 730 can generally correspond to those described above and can either be connectable or integrated with the computing device.

Input device 720 can be any suitable device that provides input, such as a touchscreen, keyboard or keypad, mouse, or voice-recognition device. Output device 730 can be any suitable device that provides output, such as a touchscreen, haptics device, or speaker.

Storage 740 can be any suitable device that provides storage, such as an electrical, magnetic, or optical memory including a RAM, cache, hard drive, or removable storage disk. Communication device 760 can include any suitable device capable of transmitting and receiving signals over a network, such as a network interface chip or device. The components of the computing device can be connected in any suitable manner, such as via a physical bus, or wirelessly.

Software 750, which can be stored in storage 740 and executed by processor 710, can include, for example, the programming that embodies the functionality of the present disclosure (e.g., as embodied in the devices described above). For example, software 750 may include system software (e.g., an operating system), application software, or security software.

Software 750 can also be stored and/or transported within any non-transitory, computer-readable storage medium for use by or in connection with an instruction execution system, apparatus, or device, such as those described above, that can fetch instructions associated with the software from the instruction execution system, apparatus, or device and execute the instructions. In the context of this disclosure, a computer-readable storage medium can be any medium, such as storage 740, that can contain or store programming for use by or in connection with an instruction-execution system, apparatus, or device.

Software 750 can also be propagated within any transport medium for use by or in connection with an instruction-execution system, apparatus, or device, such as those described above, that can fetch instructions associated with the software from the instruction-execution system, apparatus, or device and execute the instructions. In the context of this disclosure, a transport medium can be any medium that can communicate, propagate, or transport programming for use by or in connection with an instruction-execution system, apparatus, or device. The transport readable medium can include, but is not limited to, an electronic, magnetic, optical, electromagnetic, or infrared wired or wireless propagation medium.

Device 700 may be connected to a network, which can be any suitable type of interconnected communication system. The network can implement any suitable communications protocol and can be secured by any suitable security protocol. The network can comprise network links of any suitable arrangement that can implement the transmission and reception of network signals, such as wireless network connections, T1 or T3 lines, cable networks, DSL, or telephone lines.

Device 700 can implement any operating system suitable for operating on the network. Software 750 can be written in any suitable programming language, such as C, C++, Java, or Python. In various embodiments, application software embodying the functionality of the present disclosure can be deployed in different configurations, such as in a client/server arrangement, for example.

The foregoing description, for purpose of explanation, has made reference to specific embodiments. However, the illustrative discussions above are not intended to be exhaustive or to limit the disclosure to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments, with various modifications, that are suited to the particular use contemplated.

Although the disclosure and examples have been fully described with reference to the accompanying figures, it is to be noted that various changes and modifications will be apparent to those skilled in the art. Such changes and modifications are to be understood as being included within the scope of the disclosure and examples as defined by the claims.

What is claimed is:

1. A method for limiting video surveillance to authorized uses, comprising:
at a surveillance system:
receiving a video footage of an area under surveillance from a security camera;
analyzing the video footage to detect a plurality of events in the video footage;
generating a video collection comprising a copy of a plurality of portions of the video footage based on applying a watchlist indicating an approved event of interest to the analyzed video footage, wherein each copied portion is detected to include the approved event;
encrypting the video footage using a first key to restrict a first user from accessing other portions of the video footage that do not include the approved event; and
providing the first user access to the video collection;
wherein the watchlist comprises an indication of the approved event and a plurality of associated parameters for video surveillance, the plurality of parameters including a location approved for surveilling the event, and the method comprises:

determining which video segments of the video footage meets the plurality of parameters and includes the approved event, wherein the plurality of copied portions of the video footage comprises the determined video segments, and determining that the video footage is associated with the approved location before generating the video collection, wherein determining that the video footage is associated with the approved location comprises analyzing the video footage to identify one or more features that uniquely identifies the location or determining that metadata of the received video footage indicates the location, and wherein the method comprises:
transmitting the first key to an authorization system that controls access to a plurality of encrypted video footages,
receiving a notification from the authorization system indicating that the first key was received and securely stored by the authorization system, and
irrecoverably deleting the first key from the surveillance system.

2. The method of claim 1, wherein the approved event comprises a class of targets or a specific target.

3. The method of claim 1, wherein the plurality of parameters comprises one or more locations and one or more time periods approved for surveilling the target.

4. The method of claim 1, wherein the first key is a first public key, and the method comprises:
receiving the first public key from an authorization system that controls access to a plurality of encrypted video footage, wherein the authorization system stores a first key pair comprising the first public key and a first private key, and
wherein the encrypted video footage can only be decrypted using the first private key located at the authorization system.

5. The method of claim 1, wherein providing the users access to the video collection comprises:
encrypting the video collection using a second key pair associated with the user to prevent other users from being able to access the video collection, wherein the video collection is decrypted using the second key pair when access to video content in the video collection is requested by the user.

6. The method of claim 1, wherein analyzing the video footage comprises:
generating a meta data file comprising an index that maps each event from the plurality of targets to one or more portions of the video footage detected to include the event.

7. The method of claim 6, comprising:
encrypting the metadata file with the first key.

8. The method of claim 6, wherein generating the video collection comprises:
identifying the plurality of portions of the video footage that include the approved event by searching the metadata file; and
copying the plurality of identified portions to the video collection.

9. The method of claim 6, comprising:
generating a second metadata file that includes the index for the approved event and that removes or redacts the index to non-approved events of the plurality of events.

10. The method of claim 1, wherein the approved event is a first approved event, wherein the watchlist indicates a second disapproved event whose captured video cannot be accessed by the users, and wherein each copied portion is detected to include the first approved event and not include the second disapproved event.

11. The method of claim 1, comprising:
receiving a request from an authorization system to apply a n updated watchlist associated with the users to the encrypted video footage;
decrypting the encrypted video footage encrypted by a first encryption key using a decryption key received from the authorization system;
generating a second video collection including a copy of a second plurality of portions from the decrypted video footage based on the updated watchlist, wherein each portion comprises one or more approved events from the updated watchlist;
encrypting the decrypted video footage using a second encryption key to restrict the users from accessing other portions of the video footage not approved by the updated watchlist; and
providing the users access to the second video collection.

12. A surveillance system for limiting video surveillance to authorized uses, comprising:
one or more processors;
memory comprising a local storage; and
one or more programs, wherein the one or more programs are stored in the memory and configured to be executed by the one or more processors, the one or more programs including instructions for:
receiving a video footage of an area under surveillance from a security camera;
analyzing the video footage to detect a plurality of events in the video footage;
generating a video collection comprising a copy of a plurality of portions of the video footage based on applying a watchlist indicating an approved event of interest to the analyzed video footage, wherein each copied portion is detected to include the approved event;
encrypting the video footage using a first key to restrict a first user from accessing other portions of the video footage that do not include the approved event; and
providing the first user access to the video collection,
wherein the watchlist comprises an indication of the approved event and a plurality of associated parameters for video surveillance, the plurality of parameters including a location approved for surveilling the event, and the one or more programs include instructions for:
determining which video segments of the video footage meets the plurality of parameters and includes the approved event, wherein the plurality of copied portions of the video footage comprises the determined video segments, and
determining that the video footage is associated with the approved location before generating the video collection, wherein determining that the video footage is associated with the approved location comprises analyzing the video footage to identify one or more features that uniquely identifies the location or determining that metadata of the received video footage indicates the location, and
wherein the one or more programs include instructions for:
transmitting the first key to an authorization system that controls access to a plurality of encrypted video footages, receiving a notification from the authorization system indicating that the first key was received and securely stored by the authorization system, and irrecoverably deleting the first key from the surveillance system.

13. The system of claim 12, wherein the approved event comprises a class of targets or a specific target.

14. The system of claim 12, wherein the plurality of parameters comprises one or more locations and one or more time periods approved for surveilling the target.

15. The system of claim 12, wherein the first key is a first public key, and the one or more programs include instructions for:

receiving the first public key from an authorization system that controls access to a plurality of encrypted video footage, wherein the authorization system stores a first key pair comprising the first public key and a first private key, and wherein the encrypted video footage can only be decrypted using the first private key located at the authorization system.

16. The system of claim 12, wherein providing the users access to the video collection comprises:

encrypting the video collection using a second key pair associated with the user to prevent other users from being able to access the video collection, wherein the video collection is decrypted using the second key pair when access to video content in the video collection is requested by the user.

17. The system of claim 12, wherein analyzing the video footage comprises:

generating a metadata file comprising an index that maps each event from the plurality of targets to one or more portions of the video footage detected to include the event.

18. The system of claim 17, wherein the one or more programs include instructions for:

encrypting the metadata file with the first key.

19. The system of claim 17, wherein generating the video collection comprises:

identifying the plurality of portions of the video footage that include the approved event by searching the metadata file; and copying the plurality of identified portions to the video collection.

20. The system of claim 17, wherein the one or more programs include instructions for:

generating a second metadata file that includes the index for the approved event and that removes or redacts the index to non-approved events of the plurality of events.

21. The system of claim 12, wherein the approved event is a first approved event, wherein the watchlist indicates a second disapproved event whose captured video cannot be accessed by the users, and wherein each copied portion is detected to include the first approved event and not include the second disapproved event.

22. The system of claim 12, wherein the one or more programs include instructions for:

receiving a request from an authorization system to apply an updated watchlist associated with the users to the encrypted video footage;

decrypting the encrypted video footage encrypted by a first encryption key using a decryption key received from the authorization system;

generate a second video collection including a copy of a second plurality of portions from the decrypted video footage based on the updated watchlist, wherein each portion comprises one or more approved events from the updated watchlist;

encrypting the decrypted video footage using a second encryption key to restrict the users from accessing other portions of the video footage not approved by the updated watchlist; and provide the users access to the second video collection.

23. A non-transitory computer-readable storage medium comprising one or more programs for targeted video surveillance processing, wherein the one or more programs, when executed by one or more processors, cause the one or more processors to perform a method that comprises:

receiving a video footage of an area under surveillance from a security camera;

analyzing the video footage to detect a plurality of events in the video footage;

generating a video collection comprising a copy of a plurality of portions of the video footage based on applying a watchlist indicating an approved event of interest to the analyzed video footage, wherein each copied portion is detected to include the approved event;

encrypting the video footage using a first key to restrict a first user from accessing other portions of the video footage that do not include the approved event; and providing the first user access to the video collection wherein the watchlist comprises an indication of the approved event and a plurality of associated parameters for video surveillance, the plurality of parameters including a location approved for surveilling the event, and the method comprises:

determining which video segments of the video footage meets the plurality of parameters and includes the approved event, wherein the plurality of copied portions of the video footage comprises the determined video segments, and determining that the video footage is associated with the approved location before generating the video collection, wherein determining that the video footage is associated with the approved location comprises analyzing the video footage to identify one or more features that uniquely identifies the location or determining that metadata of the received video footage indicates the location, and wherein the method comprises:

transmitting the first key to an authorization system that controls access to a plurality of encrypted video footages, receiving a notification from the authorization system indicating that the first key was received and securely stored by the authorization system, and irrecoverably deleting the first key from the surveillance system.

24. The non-transitory computer-readable storage medium of claim 23, wherein the approved event comprises a class of targets or a specific target.

25. The non-transitory computer-readable storage medium of claim 23, wherein the plurality of parameters comprises one or more locations and one or more time periods approved for surveilling the target.

26. The non-transitory computer-readable storage medium of claim 23, wherein the first key is a first public key, comprising:

receiving the first public key from an authorization system that controls access to a plurality of encrypted video footage, wherein the authorization system stores a first key pair comprising the first public key and a first private key, and wherein the encrypted video footage can only be decrypted using the first private key located at the authorization system.

27. The non-transitory computer-readable storage medium of claim 23, wherein providing the users access to the video collection comprises:

encrypting the video collection using a second key pair associated with the user to prevent other users from being able to access the video collection, wherein the video collection is decrypted using the second key pair when access to video content in the video collection is requested by the user.

28. The non-transitory computer-readable storage medium of claim 23, wherein analyzing the video footage comprises:

generating a metadata file comprising an index that maps each event from the plurality of targets to one or more portions of the video footage detected to include the event.

29. The non-transitory computer-readable storage medium of claim 28, wherein the method comprises:

encrypting the metadata file with the first key.

30. The non-transitory computer-readable storage medium of claim 28, wherein generating the video collection comprises:

identifying the plurality of portions of the video footage that include the approved event by searching the metadata file; and copying the plurality of identified portions to the video collection.

31. The non-transitory computer-readable storage medium of claim 28, wherein the method comprises:

generating a second metadata file that includes the index for the approved event and that removes or redacts the index to non-approved events of the plurality of events.

32. The non-transitory computer-readable storage medium of claim 23, wherein the approved event is a first approved event, wherein the watchlist indicates a second disapproved event whose captured video cannot be accessed by the users, and wherein each copied portion is detected to include the first approved event and not include the second disapproved event.

33. The non-transitory computer-readable storage medium of claim 23, wherein the method comprises:

receiving a request from an authorization system to apply an updated watchlist associated with the users to the encrypted video footage;

decrypting the encrypted video footage encrypted by a first encryption key using a decryption key received from the authorization system;

generating a second video collection including a copy of a second plurality of portions from the decrypted video footage based on the updated watchlist, wherein each portion comprises one or more approved events from the updated watchlist;

encrypting the decrypted video footage using a second encryption key to restrict the users from accessing other portions of the video footage not approved by the updated watchlist; and providing the users access to the second video collection.

* * * * *